US011120829B2

United States Patent
Kataoka et al.

(10) Patent No.: US 11,120,829 B2
(45) Date of Patent: Sep. 14, 2021

(54) MAGNETIC RECORDING MEDIUM HAVING TIN CONTAINING SEED LAYER

(71) Applicant: FUJI ELECTRIC CO., LTD., Kawasaki (JP)

(72) Inventors: Hiroyasu Kataoka, Matsumoto (JP); Tsuyoshi Yoshizawa, Matsumoto (JP); Tomohiro Moriya, Matsumoto (JP); Shinji Uchida, Matsumoto (JP); Hirohisa Oyama, Matsumoto (JP); Takehito Shimatsu, Sendai (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 158 days.

(21) Appl. No.: 16/287,651

(22) Filed: Feb. 27, 2019

(65) Prior Publication Data
US 2019/0198051 A1    Jun. 27, 2019

Related U.S. Application Data

(63) Continuation of application No. PCT/JP2018/002734, filed on Jan. 29, 2018.

(30) Foreign Application Priority Data

Mar. 10, 2017   (JP) .............................. JP2017-046648

(51) Int. Cl.
   *G11B 5/73*   (2006.01)
   *G11B 5/65*   (2006.01)

(52) U.S. Cl.
   CPC ............ *G11B 5/7379* (2019.05); *G11B 5/656* (2013.01); *G11B 5/737* (2019.05); *G11B 5/7369* (2019.05)

(58) Field of Classification Search
   None
   See application file for complete search history.

(56) References Cited

U.S. PATENT DOCUMENTS 9,196,281 B2 *  11/2015  Inaba ................... G11B 5/7325
9,689,065 B2 *   6/2017  Chen ..................... C23C 14/083
(Continued)

FOREIGN PATENT DOCUMENTS

CN    105027202 A    11/2015
CN    105745707 A     7/2016
(Continued)

OTHER PUBLICATIONS

Derwent Abstract Translation of WO 2016-194383 A1 (Year: 2016).*
(Continued)

*Primary Examiner* — Kevin M Bernatz
(74) *Attorney, Agent, or Firm* — Rabin & Berdo, P.C.

(57) ABSTRACT

A magnetic recording medium with a reduced average grain diameter and reduced grain diameter dispersion is provided. A magnetic recording medium having a magnetic property (magnetic anisotropy energy) applicable as a magnetic recording medium is provided. It is a magnetic recording medium containing a substrate, a grain diameter control layer, a first seed layer, a second seed layer, and a magnetic recording layer containing an ordered alloy in this order, in which the second seed layer is composed of crystal grains having TiN as a main component, and a grain boundary material having at least one or more selected from the group consisting of metal oxides and carbon as a main component.

14 Claims, 20 Drawing Sheets

(56) References Cited

U.S. PATENT DOCUMENTS

| | | | |
|---|---|---|---|
| 2005/0214592 A1 | 9/2005 | Maeda et al. | |
| 2009/0136782 A1* | 5/2009 | Lu | G11B 5/7379 |
| | | | 428/828 |
| 2010/0182714 A1 | 7/2010 | Kanbe et al. | |
| 2014/0072828 A1* | 3/2014 | Inaba | G11B 5/84 |
| | | | 428/831 |
| 2014/0093748 A1* | 4/2014 | Chen | G11B 5/7369 |
| | | | 428/831 |
| 2014/0204484 A1 | 7/2014 | Inoue et al. | |
| 2015/0093598 A1* | 4/2015 | Kubota | G11B 5/647 |
| | | | 428/831.2 |
| 2015/0194175 A1 | 7/2015 | Chen et al. | |
| 2015/0213823 A1* | 7/2015 | Uchida | G11B 5/73 |
| | | | 428/846.9 |
| 2016/0125904 A1* | 5/2016 | Arora | G11B 5/7325 |
| | | | 428/831.2 |
| 2016/0267934 A1* | 9/2016 | Furuta | G11B 5/65 |
| 2017/0301366 A1* | 10/2017 | Chen | G11B 5/65 |
| 2018/0040346 A1* | 2/2018 | Moriya | C23C 14/024 |
| 2018/0122416 A1* | 5/2018 | Uchida | G11B 5/65 |
| 2018/0182421 A1* | 6/2018 | Fukushima | G11B 5/7325 |

FOREIGN PATENT DOCUMENTS

| | | |
|---|---|---|
| CN | 105874536 A | 8/2016 |
| JP | 2002334424 A | 11/2002 |
| JP | 2005-276364 A | 10/2005 |
| JP | 2009-158053 A | 7/2009 |
| JP | 2010-129163 A | 6/2010 |
| JP | 2015-530691 A | 10/2015 |
| JP | 2016-003596 A | 1/2016 |

OTHER PUBLICATIONS

Kim et al. (J. App. Phys., 109, 07B723, 2011) (Year: 2011).*
R. F. Penoyer, "Automatic Torque Balance for Magnetic Anisotropy Measurements," The Review of Scientific Instruments, vol. 30, No. 8, pp. 711-714, Aug. 1959.
Shoshin Chikazumi, "Physics of Ferromagnetism", vol. 2, pp. 10-21, Shokabo Co., Ltd.; English translation.

* cited by examiner

SEM PHOTOGRAPH OF SAMPLE No. = 3 IN EXAMPLE 3

SEM PHOTOGRAPH OF SAMPLE No. = 5 IN COMPARATIVE EXAMPLE 2

SEM PHOTOGRAPH OF SAMPLE No. = 6-3 IN COMPARATIVE EXAMPLE 3

SEM PHOTOGRAPH OF SAMPLE No. = 7-3 IN COMPARATIVE EXAMPLE 4

MAGNETIC RECORDING MEDIUM HAVING TIN CONTAINING SEED LAYER

CROSS-REFERENCE TO RELATED APPLICATIONS

This application is a continuation application of PCT Application No. PCT/JP2018/002734 filed on Jan. 29, 2018 under 37 Code of Federal Regulation § 1.53 (b), and the PCT application claims the benefit of Japanese Patent Application No. 2017-046648 filed on Mar. 10, 2017, all of the above applications being hereby incorporated by reference wherein in their entirety.

BACKGROUND OF THE INVENTION

Field of the Invention

The present invention relates to a magnetic recording medium, and relates typically to a magnetic recording medium for use in a hard disk magnetic recording drive (HDD).

Description of the Related Art

A perpendicular magnetic recording system is employed as a technology for realizing a high density of magnetic recording. A perpendicular magnetic recording medium contains at least a non-magnetic substrate, and a magnetic recording layer formed from a hard magnetic material.

For the purpose of obtaining good magnetic properties, it is proposed to form a magnetic recording layer of a perpendicular magnetic recording medium using a granular structure. A magnetic recording layer of a granular structure contains magnetic crystal grains and a non-magnetic grain boundary material segregating so as to surround the circumference of the magnetic crystal grain. Respective magnetic crystal grains in the magnetic recording layer of the granular structure are separated magnetically with the non-magnetic grain boundary material.

Recently, for the purpose of further improving a recording density of a perpendicular magnetic recording medium, it is required to reduce grain diameters of magnetic crystal grains in a magnetic recording layer of a granular structure. Particularly in the case of HAMR (heat-assisted magnetic recording) medium, there is a demand for reducing an average grain diameter and grain diameter dispersion by controlling a grain structure of a recording layer with an underlayer of Ru or the like, in the same way as existing perpendicular magnetic recording media.

Japanese Patent Application 2016-003596 describes a magnetic recording medium having a configuration that contains a substrate, a Ru—$TiO_2$ layer, a ZnO layer, a MgO layer, and an FePt magnetic recording layer in this order. This aims at a good balance between a minute granular diameter and magnetic properties of the FePt magnetic recording layer composed of a granular structure.

Japanese Patent Laid-Open No. 2015-530691 describes a magnetic recording medium containing a substrate, a magnetic recording layer, and a TiN—X layer disposed between the substrate and the magnetic recording layer. This aims at improvement of orientation properties in epitaxial growth of the magnetic recording layer and control of granularity of the magnetic recording layer.

SUMMARY OF THE INVENTION

In Japanese Patent Application 2016-003596, although FePt grains can be made small, there was a problem that an FePt grain diameter became large compared to a grain diameter in a MgO layer.

Moreover, in Japanese Patent Laid-Open No. 2015-530691, segregation of a non-magnetic body, which was expected to surround the circumference of an FePt magnetic crystal grain, was irregular. Therefore, there was a problem that many parts in which FePt magnetic grains were connected to cause insufficient magnetic separation between respective magnetic grains.

One problem to be solved by the present invention is to provide a magnetic recording medium in which an average grain diameter and grain diameter dispersion are reduced. Another problem to be solved by the present invention is to provide a magnetic recording medium having a magnetic property (magnetic anisotropy energy) applicable as a magnetic recording medium.

An example of means for solving the problem of the present invention is a magnetic recording medium, containing a substrate, a grain diameter control layer, a first seed layer, a second seed layer, and a magnetic recording layer containing an ordered alloy in this order, wherein the second seed layer is composed of crystal grains having TiN as a main component, and a grain boundary material having at least one or more selected from the group consisting of metal oxides and carbon as a main component.

Here, it is preferable that, when the grain boundary material is a metal oxide and $\Delta G_{500}$ is defined as a standard Gibbs energy of formation at 500° C., the grain boundary material is selected from materials such that $\Delta G_{500}$ of a nitride that is formed through a reaction between a metal element in the metal oxide and nitrogen is higher than $\Delta G_{500}$ of TiN. Alternatively, it is preferable that, when the grain boundary material is a metal oxide and $\Delta G_{500}$ is defined as a standard Gibbs energy of formation at 500° C., the grain boundary material is selected from materials such that $\Delta G_{500}$ of an oxide that is formed through a reaction between a metal element in the metal oxide and oxygen is lower than $\Delta G_{500}$ of $TiO_2$.

Moreover, preferably the grain boundary material is at least one or more selected from the group consisting of $Al_2O_3$, MgO, CaO, $Sc_2O_3$, SrO and $Y_2O_3$. Alternatively, preferably the grain boundary material is formed from carbon.

Moreover, preferably the grain boundary material is 5 volume % or more and less than 50 volume % on the basis of the total amount of crystal grains having TiN as a main component and the grain boundary material.

Here, preferably the second seed layer has a granular structure composed of crystal grains having TiN as a main component and the grain boundary material surrounding the crystal grain having TiN as a main component.

Moreover, preferably the magnetic recording layer contains at least one of first element selected from the group consisting of Fe and Co, and at least one of second element selected from the group consisting of Pt, Pd, Au, Ir, Ru and Rh.

Furthermore, preferably the first seed layer contains a downside first seed layer and an upside first seed layer in this order.

Furthermore, preferably the grain diameter control layer has a granular structure containing Ru crystal grains, and at least one selected from the group consisting of oxides, carbides and nitrides, surrounding the Ru crystal grain.

Furthermore, a preferable state is that a non-magnetic intermediate layer is further contained between the grain diameter control layer and the first seed layer, and that the non-magnetic intermediate layer has a granular structure containing Pt crystal grains, or Pt crystal grains and at least one selected from the group consisting of oxides, carbon, carbides and nitrides, surrounding the Pt crystal grain.

Furthermore, preferably an orientation control layer formed from Ru or a Ru alloy is contained between the substrate and the grain diameter control layer.

According to the present invention, it is possible to form a magnetic recording medium in which an average grain diameter and grain diameter dispersion are reduced. Moreover, it is possible to form a magnetic recording medium having a large magnetic anisotropy energy.

Further features of the present invention will become apparent from the following description of exemplary embodiments with reference to the attached drawings.

DESCRIPTION OF THE EMBODIMENTS

Figure 1:
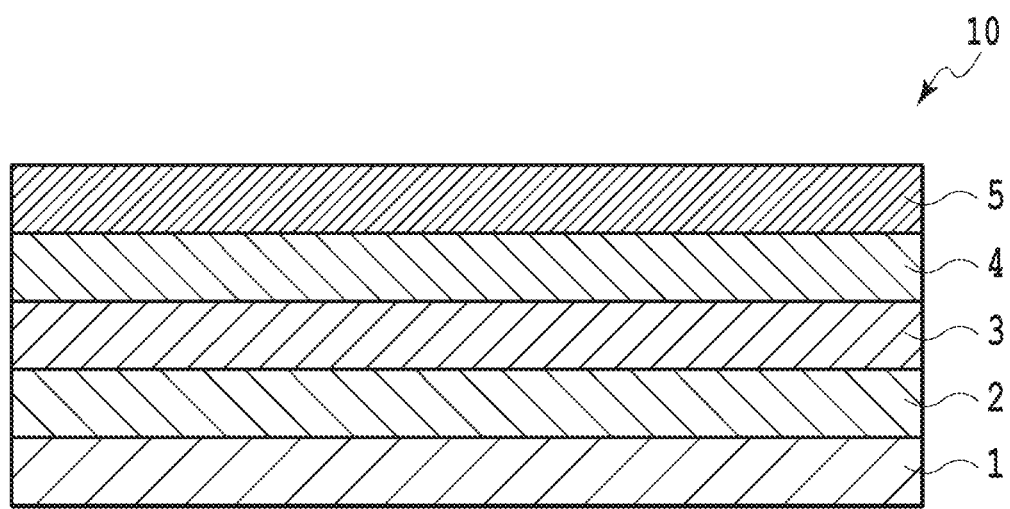
FIG. 1 is an outline cross-sectional view showing one configuration example of the magnetic recording medium of the present invention.
Figure 2:
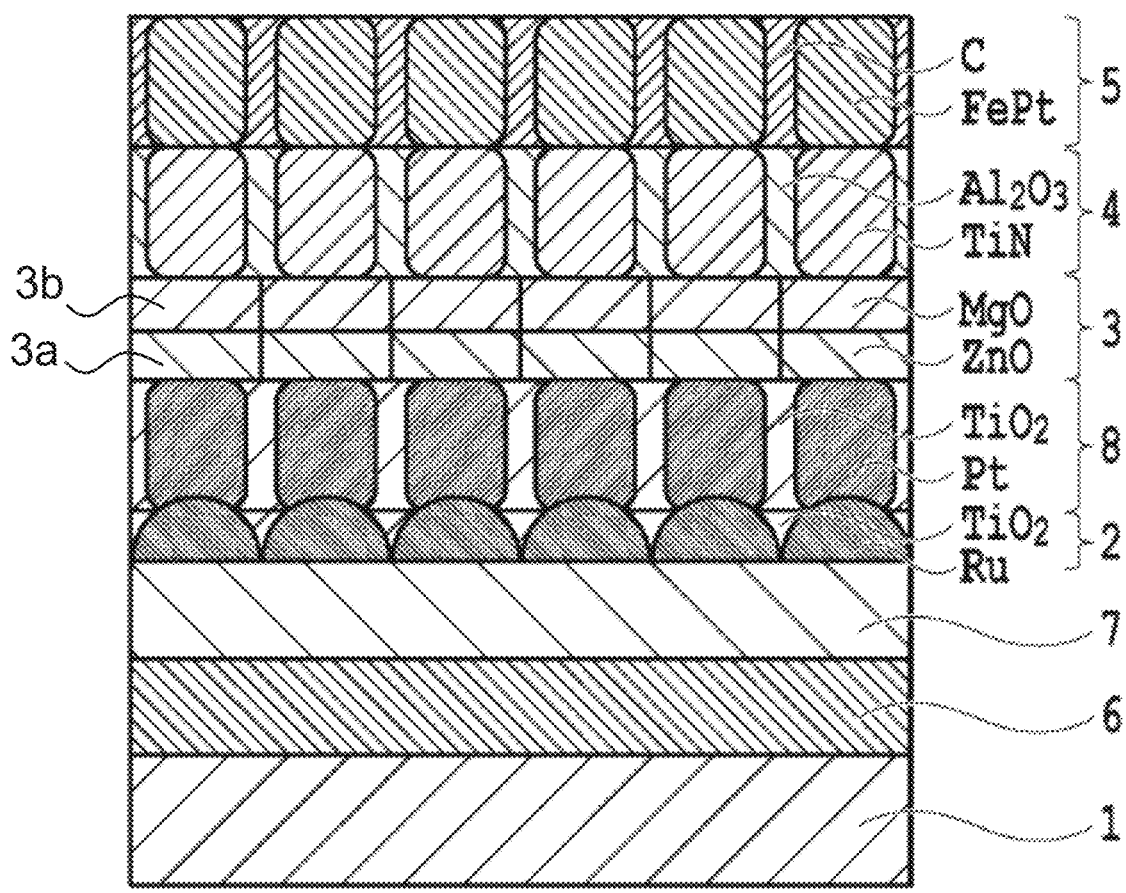
FIG. 2 is an outline cross-sectional view showing a configuration example of the magnetic recording medium in Example 1.

In FIGS. 1, 2, there is shown an example of embodiments for practicing the present invention.

FIG. 1 shows one configuration example of a magnetic recording medium 10 containing in a following order a substrate 1, a grain diameter control layer 2, a first seed layer 3, a second seed layer 4, a magnetic recording layer 5 containing an ordered alloy, in which the second seed layer 4 is formed from crystal grains having TiN (titanium nitride) as a main component and a grain boundary material. Meanwhile, in following explanations of the present application, the same reference sign is given to common configurations and explanation thereof is omitted.

In the configuration of the present embodiment, there is the grain diameter control layer 2 having a granular structure for introducing the granular structure of the magnetic recording layer 5. The granular structure of the grain diameter control layer 2 is preferably composed of crystal grains having a minute average grain diameter and a reduced grain diameter dispersion. The first seed layer 3 formed thereon is formed from crystal grains that are minute and have a reduced grain diameter dispersion, while taking over the grain structure of the grain diameter control layer 2.

Here, a granular structure means a structure in which a grain boundary material exists so as to surround circumference relative to an individual crystal grain lying in a columnar shape. It is a state in which a granular crystal grain exists and a grain boundary material exists around the circumference thereof, in a film surface parallel to a substrate. Complete surrounding is preferable because isolation properties of the grain is enhanced. On the other hand, in a film surface perpendicular to the substrate, a state in which columnar crystal grains separated with the grain boundary material go through over the front and back surfaces of respective layers is preferable. The granular structure is formed by segregation of the grain boundary material at the grain boundary of crystal grains.

Moreover, a grain diameter means a circle equivalent diameter of a granular crystal grain in a film surface parallel to a substrate. An average grain diameter means an average value of grain diameters. A grain diameter dispersion means a dispersion value of grain diameters.

Next, on the first seed layer 3, the second seed layer 4 is formed. Consequently, corresponding to the grain boundary of the first seed layer 3 composed of crystal grains that are minute with a reduced grain diameter dispersion, the grain boundary material of the second seed layer 4 is segregated actively. Therefore, the second seed layer 4 takes over the grain structure of the first seed layer 3, and eventually of the grain diameter control layer 2. More preferably, there is given a granular structure composed of crystal grains composed of TiN that is minute with a reduced grain diameter dispersion, and a grain boundary material surrounding the circumference of the TiN crystal grain.

Furthermore, the second seed layer 4 is formed directly beneath the magnetic recording layer 5. Consequently, the magnetic recording layer 5, which has a good granular structure composed of crystal grains with a minute average grain diameter and a reduced grain diameter dispersion, can be formed. Magnetic crystal grains composed of an ordered alloy such as FePt have high wettability compared to the TiN crystal grain of the second seed layer 4. Furthermore, in the case of a grain boundary material of the second seed layer 4 containing an oxide or carbon and in the case of a non-magnetic body (grain boundary material) of the magnetic recording layer 5 containing an oxide or carbon, the non-magnetic body of the magnetic recording layer 5 has higher wettability compared to the grain boundary material of the second seed layer 4. The reason is that magnetic crystal grains are formed actively on TiN crystal grains of the second seed layer 4, and that the non-magnetic body (grain boundary materials) segregates actively on the grain boundary material of the second seed layer 4. Eventually, it becomes possible to form the magnetic recording layer 5 having a granular structure reflecting more the grain structure of the grain diameter control layer 2. In this way, it becomes possible to give a minute grain diameter and reduced grain diameter dispersion of magnetic crystal grains. Moreover, magnetic crystal grains are formed actively on TiN crystal grains of the second seed layer 4, and the non-magnetic body (grain boundary material) segregates actively on the grain boundary material of the second seed layer 4. Therefore, the magnetic recording layer 5 having a granular structure composed of magnetic crystal grains magnetically separated individually can be formed. Furthermore, magnetic crystal grains formed straddling the grain boundary of the second seed layer are reduced. Magnetic crystal grains formed straddling the grain boundary of the second seed layer have a crystallographic defect to reduce a magnetic anisotropy energy. In the present embodiment, magnetic crystal grains having such crystallographic defect are few and, therefore, an effect is exhibited for improving a magnetic anisotropy energy.

The substrate 1 may be various substrates having a flat surface. For example, a material for use in a general magnetic recording medium may be used to form the substrate 1. Usable materials include NiP-plated Al alloys, MgO single crystal, $MgAl_2O_4$, $SrTiO_3$, reinforced glass, crystallized glass and the like.

Between the substrate 1 and the grain diameter control layer 2 to be described later in detail, there may be provided optionally an adhesion layer 6, a soft magnetic backing layer, a heat sink layer, or an orientation control layer 7.

Optionally, the adhesion layer 6 may be provided. The adhesion layer 6 is used for enhancing adhesion properties between a layer to be formed on the adhesion layer 6 and a layer to be formed under the adhesion layer 6. The layer to be formed under the adhesion layer 6 includes the substrate 1. Materials for forming the adhesion layer 6 include metals such as Ni, W, Ta and Cr, CoNi-based alloys, Ni alloys, Pt alloys, Pd alloys, Ta alloys, Cr alloys, CrTi alloys, Si alloys, and Cu alloys. The adhesion layer 6 may be a single layer, or have a laminated structure of plural layers. The adhesion layer 6 that is preferable in this configuration example is composed of a CrTi alloy. The adhesion layer 6 can also be formed using any method known in the art, such as a sputtering method.

Optionally, a soft magnetic backing layer (not illustrated) may be provided. The soft magnetic backing layer controls a magnetic flux from a magnetic head to improve recording/reproducing characteristics of a magnetic recording medium. Materials for forming a soft magnetic backing layer include crystalline materials such as a NiFe alloy, sendust (FeSiAl) alloy and CoFe alloy, microcrystalline materials such as FeTaC, CoFeNi and CoNiP, and amorphous materials containing a Co alloy such as CoZrNb and CoTaZr. The optimum value of thickness of the soft magnetic backing layer depends on a structure and characteristics of a magnetic head for use in magnetic recording. In the case where a soft magnetic backing layer is formed continuously to another layer, taking productivity into consideration, the soft magnetic backing layer preferably has a thickness falling within a range from 10 nm to 500 nm (including both ends). The soft magnetic backing layer can also be formed using any method known in the art, such as a sputtering method.

Optionally, a heat sink layer (not illustrated) may be provided. The heat sink layer is used suitably in the case where the magnetic recording medium of the present invention is used in a heat-assisted magnetic recording system. The heat sink layer is a layer for absorbing effectively excessive heat of the magnetic recording layer 5 generated in heat-assisted magnetic recording. The heat sink layer can be formed using a material having a high thermal conductivity and high specific heat capacity. Such materials include elemental Cu, elemental Ag, elemental Au, or alloy materials containing these as a main component. Here, "contain as a main component" shows that the content of the material is 50 wt % or more. In addition, from the viewpoint of strength and the like, the heat sink layer can be formed using an Al—Si alloy, Cu—B alloy or the like. Furthermore, a sendust (FeSiAl) alloy, soft magnetic CoFe alloy or the like can be used for forming a heat sink layer. By use of the soft magnetic material, a function of concentrating a perpendicular magnetic field generated by a head to the magnetic recording layer 5 can also be given to the heat sink layer, to thereby complement the function of the soft magnetic backing layer. The optimum value of the thickness of the heat sink layer varies according to a heat quantity and heat distribution in heat-assisted magnetic recording, and a layer configuration and thickness of each configuration layer of a magnetic recording medium. In the case where a heat sink layer is to be formed continuously to another configuration layer etc., taking productivity into consideration, the thickness thereof is preferably 10 nm or more and 100 nm or less. The heat sink layer can be formed using any method known in the art, such as a sputtering method or a vacuum vapor deposition method. In general cases, the heat sink layer is formed using a sputtering method. The heat sink layer can be formed, considering properties required for a magnetic recording medium, between the substrate 1 and the adhesion layer 6, between the adhesion layer 6 and the orientation control layer 7, and the like.

Optionally, the orientation control layer 7 may be provided. The orientation control layer 7 is a layer for controlling orientation of a layer to be formed on the orientation control layer 7. The orientation control layer is formed between the adhesion layer 6 and the grain diameter control layer 2 to be described later, between the non-magnetic intermediate layer 8 to be described later and the first seed layer 3 to be described later, or the like. The orientation control layer 7 may be a single layer, or may be a multilayer. Materials usable for the orientation control layer 7 are, suitably, materials having an hcp structure or a face-centered cubic (fcc) structure, but are not limited to these. The orientation control layer 7 contains, for example, Ru or a Ru alloy. Ru alloys are, for example, alloys of Ru and Cr, Co or the like. Ru or Ru alloys may further contain one or plural elements selected from the group consisting of Cr, W, Mo, Ta, Nb, B, Mn, Al and Ti. The orientation control layer 7 preferable in this configuration example is a laminated structure of Ru/RuCr or a layer formed from Ru. The orientation control layer 7 can be formed using any method known in the art, such as a sputtering method. Meanwhile, expression such as A/B means that A is an upper layer and B is a lower layer.

The grain diameter control layer 2 is a layer, typically, having a granular structure for introducing a good granular structure up to the magnetic recording layer 5. The grain diameter control layer 2 can be formed using any method known in the art, such as a sputtering method. Specifically, the grain diameter control layer 2 contains Ru or a Ru alloy, and at least one material selected from the group consisting of oxides, carbides and nitrides. More preferably, Ru or a Ru alloy, and at least one material selected from the group consisting of oxides, carbides and nitrides are contained as a main component. Here, the "main component" shows that the content of "Ru or a Ru alloy, and at least one material selected from the group consisting of oxides, carbides and nitrides" is 50 volume % or more. Meanwhile, at least one material selected from the group consisting of oxides, carbides and nitrides to be contained with Ru or a Ru alloy can also be referred to as a grain boundary material. The grain boundary material can be, for example, an oxide such as $SiO_2$, $TiO_2$ and ZnO, a carbide such as SiC, TiC and WC, or a nitride such as SiN and TiN. An amount of the grain boundary material contained with Ru or a Ru alloy to form a granular structure is preferably 5 volume % or more and less than 50 volume %, more preferably 10 volume % or more and 45 volume % or less, and further preferably 20 volume % or more and 40 volume % or less, on the basis of the combined total amount of Ru or a Ru alloy, and the grain boundary material. Meanwhile, in the present application, "volume %" of a material is also described as "vol %" and means, as a principle on the basis of the total amount of a layer containing the material, a percentage of the material contained in the layer.

For example, the grain diameter control layer 2 has Ru, and $TiO_m$ (m=1.5 to 2.5) or $SiO_n$ (n=1.5 to 2.5), as the main component. The grain diameter control layer 2 has typically Ru—$TiO_2$ or alternatively Ru—$SiO_2$ as the main component. In the case where the grain diameter control layer 2 has Ru—$TiO_2$ as the main component, a granular structure has Ru crystal grains and $TiO_2$ segregating so as to surrounding the circumference of the Ru crystal grain, as the main component. Meanwhile, Ru—$TiO_2$ means a state in which Ru coexists with $TiO_2$. Ru—$SiO_2$ means a state in which Ru coexists with $SiO_2$. Meanwhile, the grain diameter control layer 2 may be a single layer or a multilayer. Layers of different grain boundary materials may be laminated, or layers of different grain boundary material concentrations may be laminated.

Optionally, between the grain diameter control layer 2 and the first seed layer 3 to be described later in detail, the non-magnetic intermediate layer 8 may be provided. The non-magnetic intermediate layer 8 is a layer for improving crystal orientation of the first seed layer 3. In this case, the non-magnetic intermediate layer 8 contains Pt and at least one material selected from the group consisting of oxides, carbon, carbides and nitrides. More preferably, Pt and at least one material selected from the group consisting of oxides, carbon, carbides and nitrides are contained as a main component. Here, the "main component" shows that the content of "Pt and at least one material selected from the group consisting of oxides, carbon, carbides and nitrides" is 50 vol % or more. The non-magnetic intermediate layer 8 has a granular structure. At least one material selected from the group consisting of oxides, carbon, carbides and nitrides contained with Pt can also be referred to as a grain boundary material. The grain boundary material may be, for example, an oxide such as $SiO_2$, $TiO_2$ or ZnO, carbon (C), a carbide such as SiC, TiC or WC, or a nitride such as SiN or TiN. Preferably, the grain boundary material of the non-magnetic intermediate layer 8 contains the same kind of compound as the grain boundary material of the grain diameter control layer 2. For example, when the grain boundary material of the non-magnetic intermediate layer 8 is an oxide, the grain boundary material of the grain diameter control layer 2 is preferably a material containing an oxide. In the same way, a combination of carbon-carbon, a carbide-a carbide, or a nitride-a nitride is preferable. More preferably, the same compound is contained. For example, in the case where the grain boundary material of the non-magnetic intermediate layer 8 is $TiO_m$ the grain boundary material of the grain diameter control layer 2 preferably contains $TiO_m$ (m=1.5 to 2.5). As a consequence, the grain boundary material of the non-magnetic intermediate layer 8 is formed actively on the grain boundary material of the grain diameter control layer 2, and a Pt crystal grain is formed on a Ru crystal grain of the grain diameter control layer 2. Therefore, a good granular structure is taken over.

In order to form a granular structure, an amount of the grain boundary material contained with Pt is preferably 5 vol % or more and less than 50 vol %, more preferably 10 vol % or more and 45 vol % or less, and further preferably 20 vol % or more and 40 vol % or less, on the basis of the combined total quantity of Pt and the grain boundary material.

Alternatively, the non-magnetic intermediate layer 8 contains Pt. More preferably, Pt is contained as a main component. Here, the "main component" shows that the content of "Pt and at least one material selected from the group consisting of oxides, carbon, carbides and nitrides" is 50 vol % or more. In the case where the non-magnetic intermediate layer 8 contains Pt as the main component, the thickness thereof is preferably from 0.1 to 3.0 nm, to keep a separation structure of crystal grains.

The first seed layer 3 is a layer for setting crystalline orientation of TiN crystal grains in the second seed layer 4 to be described later in detail to appropriate orientation, and for setting eventually crystalline orientation of an ordered alloy in the magnetic recording layer 5 to be described later in detail to appropriate orientation for a magnetic recording medium. For example, it becomes possible to set crystalline orientation of an $L1_0$-type ordered alloy to (001) orientation appropriate to a perpendicular magnetic recording medium. Moreover, to introduce the separation structure of crystal grains of the grain diameter control layer to the second seed layer 4, the thickness of the first seed layer 3 should not be made too thick. To achieve the aforementioned effect, the first seed layer 3 preferably has a thickness falling within a range of 1 nm to 30 nm. More preferably, the first seed layer 3 has a thickness falling within a range of 2 nm to 20 nm.

Typically, the first seed layer 3 contains a lower first seed layer 3a and an upper first seed layer 3b in this order, i.e., between the grain diameter control layer 2 and the second seed layer 4.

The lower first seed layer 3a has a hexagonal wurtzite crystal structure. Preferably, ZnO, AlN, GaN or alternatively InN is contained. More preferably, ZnO, AlN, GaN or InN is contained as a main component. Further preferably, ZnO (zinc oxide) is contained. Alternatively, ZnO is contained as a main component. Here, the "main component" shows that the content of the material is 50 vol % or more. In this configuration example, ZnO has typically a (002)-oriented hexagonal wurtzite crystal structure. ZnO in this configuration example includes compounds, for example, whose XRD profiles obtained by θ-2θ measurement in the orthogonal direction using X-ray diffraction have a peak in a range from 2θ=33.4° to 35.4° that is a representative peak of a ZnO crystal. ZnO may be compounds having a peak in a range from $2\theta=33.4°$ to $35.4°$, and may have either a stoichiometric composition or a nonstoichiometric composition. Moreover, Al, Ga, In or the like may be added to ZnO. Furthermore, it is believed that, even in the case where the upper first seed layer 3b is thin due to the presence of the lower first seed layer 3a, there is an effect on making the crystal orientation of the magnetic recording layer 5 good. Moreover, to introduce the separation structure of crystal grains of the grain diameter control layer to the upper first seed layer 3b, the thickness should not be made too large. To achieve the aforementioned effect, the lower first seed layer 3a preferably has a thickness falling within a range of 0.5 nm to 20 nm. More preferably, the layer has a thickness falling within a range of 1 nm to 10 nm.

The upper first seed layer 3b contains MgO (magnesium oxide). More preferably, MgO is contained as a main component. Here, the "main component" shows that the content of the MgO is 50 vol % or more. In this configuration example, MgO has typically a (002)-oriented sodium chloride type crystal structure. MgO in this configuration example includes compounds, for example, whose XRD profiles obtained by $\theta$-$2\theta$ measurement in the orthogonal direction using X-ray diffraction have a peak in a range from $2\theta=42.0°$ to $44.0°$ that is a representative peak of a MgO crystal. MgO may be compounds having a peak in a range from $2\theta=42.0°$ to $44.0°$, and may have either a stoichiometric composition or a nonstoichiometric composition. Moreover, Ca, Sr, Ba or the like may be added to MgO. The upper first seed layer 3b improves an order degree of the magnetic recording layer 5 that is to be formed thereon and is composed of an ordered alloy. Furthermore, it is believed that the upper first seed layer 3b introduces the separation structure of crystal grains of the lower first seed layer 3a to the second seed layer 4 to thereby accelerate separation of crystal grains in the second seed layer 4. To achieve the aforementioned effect, the upper first seed layer 3b preferably has a thickness falling within a range of 1 nm to 20 nm. More preferably, the upper first seed layer 3b has a thickness falling within a range of 1 nm to 10 nm.

The first seed layer 3, the lower first seed layer 3a and the upper first seed layer 3b can be formed using any method known in the art, such as a sputtering method. Here, in forming the upper first seed layer 3b, temperature of the substrate 1 is preferably set in a range of 300° C. to 500° C. Deposition of the film at this temperature can reduce surface roughness of the upper first seed layer 3b. On the other hand, in forming the lower first seed layer 3a, the temperature of the substrate 1 may be room temperature. The lower first seed layer 3a having been formed at room temperature can actualize surface roughness that is equal to or lower than roughness of the upper first seed layer 3b formed at a substrate temperature falling within a range of 300° C. to 500° C.

The second seed layer 4 is a layer for introducing the magnetic recording layer 5 to a good granular structure. The second seed layer 4 is composed of crystal grains having TiN as a main component and a grain boundary material having at least one or more materials selected from the group consisting of metal oxides and carbon as a main component. Crystal grains having TiN as the main component has good wettability with magnetic crystal grains of the magnetic recording layer 5. Therefore, on a crystal grain having TiN as the main component, a magnetic crystal grain of the magnetic recording layer 5 is formed preferentially. Eventually, it has an effect on introducing magnetic crystal grains of the magnetic recording layer 5 to a good granular structure. Moreover, crystal grains having TiN as the main component also have an effect on making crystal orientation of magnetic crystal grains of the magnetic recording layer 5 good. To obtain the effect, the second seed layer 4 is preferably composed of high quality crystal grains having TiN as the main component.

Meanwhile, in the second seed layer 4, the crystal grain and the grain boundary material are in a state of coexistence. The "crystal grain and the grain boundary material are in a state of coexistence" is a state where the grain boundary material is not mixed in the crystal grain having TiN as the main component. For the purpose, it is necessary that TiN and the grain boundary material are unlikely to react chemically each other. Moreover, specifically, the foregoing state is a state where crystal grains having TiN as the main component and the grain boundary material surrounding the grain exist, or where there are crystal grains having TiN as the main component and the grain boundary material existing locally at a triple point thereof or the like.

Here, "crystal grains having TiN as the main component" means that the content of TiN is 50 vol % or more of the total amount of crystal grains of the second seed layer 4. A larger content of TiN can lead the magnetic recording layer 5 to a better granular structure. The content is preferably 60 vol % or more, and more preferably 80 vol % or more. Further preferably, crystal grains of the second seed layer 4 are composed of TiN.

The phrase "has at least one or more materials selected from the group consisting of metal oxides and carbon as a main component" means that the content is 50 vol % or more of the total amount of grain boundary material of the second seed layer 4. Unintended impurities contained in the grain boundary of the second seed layer 4 are distinguished clearly from "at least one or more materials selected from the group consisting of metal oxides and carbon." A smaller content of unintended impurities can introduce the magnetic recording layer 5 to a better granular structure. The content is preferably 80 vol % or more, and more preferably 90 vol % or more. Further preferably, the grain boundary material of the second seed layer 4 does not contain an unintended impurity, and is composed only of at least one or more materials selected from the group consisting of metal oxides and carbon.

In this configuration example, TiN in the second seed layer 4 has typically a (002)-oriented sodium chloride type crystal structure. TiN in this configuration example includes compounds, for example, whose XRD profiles obtained by $\theta$-$2\theta$ measurement in the orthogonal direction using X-ray diffraction have a peak in a range from $2\theta=41.6°$ to $43.6°$ that is a representative peak of a TiN crystal. TiN may be compounds having a peak in a range from $2\theta=41.6°$ to $43.6°$, and may have either a stoichiometric composition or a nonstoichiometric composition. Moreover, to TiN, a material forming a nitride such as Al, Ga or In may be added. The second seed layer 4 can be formed by any method known in the art, such as a sputtering method.

Here, a change of a free energy, in which a compound is formed from a single substance at 500° C. (standard Gibbs energy of formation), is expressed as $\Delta G_{500}$. In a first aspect, in the case where a grain boundary material in the second seed layer 4 is a metal oxide, the grain boundary material is selected from materials that give a nitride, which is to be formed when a metal element reacts with nitrogen in the metal oxide, with higher $\Delta G_{500}$ than $\Delta G_{500}$ of TiN. As a consequence, a chemical reaction between the metal element in the grain boundary material and TiN is unlikely to occur. Therefore, there is no phenomenon such that the metal element in the grain boundary material and TiN form a compound and the compound is mixed into the crystal grain. Moreover, there is no phenomenon such that nitrogen is taken from TiN by the metal element in the grain boundary material, and such that a crystallographic defect is generated due to nitrogen deficiency of TiN. Furthermore, the grain boundary material separates out as the metal oxide at a grain boundary of crystal grains having TiN as the main component. Eventually, the second seed layer 4, in which high quality crystal grains having TiN as the main component and the grain boundary material coexist, can be obtained. Specifically, the grain boundary material is at least one or more selected from the group consisting of $SiO_2$, CaO, MgO, $B_2O_3$, $Ta_2O_5$, $Al_2O_3$, $CO_3O_4$, $Sc_2O_3$, SrO and $Y_2O_3$. Meanwhile, in the present invention, metal elements include Si and B.

In a second aspect, a grain boundary material in the second seed layer 4 is a metal oxide, and the grain boundary material is selected from materials that give oxides, which are to be formed when a metal element reacts with oxygen in the metal oxides, with lower $\Delta G_{500}$ than $\Delta G_{500}$ of $TiO_2$. As a consequence, a chemical reaction between oxygen in the grain boundary material and TiN is unlikely to occur. Therefore, there is no phenomenon such that oxygen and TiN form a compound and the compound is mixed into the crystal grain, not to generate a crystallographic defect of TiN. Moreover, there is no phenomenon such that the grain boundary material is reduced, and such that the metal element reduced from the grain boundary material forms a compound with TiN. Furthermore, the grain boundary material separates out as the metal oxide at a grain boundary of crystal grains having TiN as the main component. Eventually, the second seed layer 4, in which high quality crystal grains having TiN as the main component and the grain boundary material coexist, is obtained. Specifically, the grain boundary material is at least one or more selected from the group consisting of CaO, MgO, $Al_2O_3$, $Sc_2O_3$, SrO, $Y_2O_3$, $ZrO_2$ and $HfO_2$.

More preferably, a grain boundary material in the second seed layer 4 satisfies both the first and second aspects. Specifically, the grain boundary material is at least one or more selected from the group consisting of $Al_2O_3$, MgO, CaO, $Sc_2O_3$, SrO and $Y_2O_3$. As a consequence of using the above-described material, the second seed layer 4, in which the higher quality crystal grain having TiN as the main component and the grain boundary material coexist, is obtained.

Moreover, in a third aspect, a grain boundary material in the second seed layer 4 is selected from carbon. $\Delta G_{500}$ of TiC formed when carbon reacts with Ti is higher than $\Delta G_{500}$ of TiN. Therefore, carbonization of a part of TiN does not occur, and a crystallographic defect is not generated in TiN. Moreover, carbon put in as a grain boundary material separates out as carbon at a grain boundary of crystal grains having TiN as the main component. Eventually, a second seed layer, in which high quality crystal grains having TiN as the main component and the grain boundary material coexist, is obtained.

In the second seed layer 4, the grain boundary material is preferably 5 vol % or more and less than 50 vol %, more preferably 10 vol % or more and 45 vol % or less, and further preferably 20 vol % or more and 40 vol % or less, on the basis of the total amount of the second seed layer. When the amount of the grain boundary material is too large, for example, the grain boundary material wraps around the surface of the second seed layer (interface with a magnetic recording layer) to thereby disturb crystallinity of the magnetic recording layer. Moreover, for example, the grain boundary material cannot fully separate out and remains in TiN crystal grains, and therefore the crystallinity of TiN degrades to thereby disturb the crystallinity of the magnetic recording layer. Eventually, magnetic properties deteriorate. On the other hand, when the amount of the grain boundary material is too small, a separating out amount of the grain boundary material is too small, and a large number of parts that cannot surround a TiN crystal grain are generated. As a consequence, a good granular structure of the magnetic recording layer 5 cannot be introduced. It is necessary to appropriately select the amount of the grain boundary material, on the basis of the total amount of the second seed layer 4.

More preferably, the second seed layer 4 has a granular structure composed of crystal grains having TiN as the main component and a grain boundary material surrounding the circumference of the crystal grain having TiN as the main component. Here, the "main component" shows that the content of TiN is 50 vol % or more of the total amount of crystal grains. A larger content of TiN can introduce the magnetic recording layer 5 to a better granular structure. The content is preferably 60 vol % or more, and more preferably 80 vol % or more. Further preferably, the crystal grain of the second seed layer 4 is composed of TiN.

To perform good grain separation of the second seed layer 4, deposition may be performed at high temperatures. Preferable substrate temperature in deposition falls within a range from 20 to 600° C. There are such effects that 20° C. or higher accelerate good grain separation of the second seed layer 4, and that 600° C. or lower suppresses surface roughness.

To introduce a good granular structure of the magnetic recording layer 5, the second seed layer 4 preferably has a thickness falling within a range of 0.5 nm to 20 nm. More preferably, the second seed layer 4 has a thickness falling within a range of 1 nm to 10 nm. Further preferably, the second seed layer 4 has a thickness falling within a range of 2 nm to 5 nm. When the thickness is too large, a part in which columnar growth of TiN cannot be continued begins to appear, to thereby disturb gradually the granular structure of the magnetic recording layer 5; and, in contrast, when the thickness is too small, TiN is formed with irregularity, to thereby disturb the granular structure of the magnetic recording layer 5. Therefore, appropriate selection of the thickness is necessary.

The magnetic recording layer 5 contains magnetic crystal grains composed of an ordered alloy. Magnetic crystal grains composed of an ordered alloy contain, for example, at least one first element selected from the group consisting of Fe and Co, and at least one second element selected from the group consisting of Pt, Pd, Au, Ir, Ru and Rh. A preferable ordered alloy is an $L1_0$-type ordered alloy selected from the group consisting of FePt, CoPt, FePd and CoPd. For characteristic modulations, the ordered alloy may additionally contain at least one element selected from the group consisting of Ni, Mn, Cu, Ru, Ag, Au and Cr. Desirable characteristic modulations include lowering of temperature necessary for regularizing the ordered alloy.

In an ordered alloy for use in the present invention, a composition ratio of the first element compared to the second element may be set in a range from 0.7 to 1.3, preferably in a range from 0.8 to 1.1, on the basis of number of atoms. The use of the composition ratio in this range allows to obtain an $L1_0$-type ordered structure having a large magnetic anisotropy constant Ku.

Alternatively, the magnetic recording layer 5 contains a granular structure composed of magnetic crystal grains and a non-magnetic crystal grain boundary surrounding the magnetic crystal grain. Magnetic crystal grains may contain the aforementioned ordered alloy. Magnetic crystal grains composed of an ordered alloy have high wettability compared to TiN crystal grains of the second seed layer 4. Therefore, on the TiN crystal grain of the second seed layer 4, the magnetic crystal grain is formed actively. The non-magnetic crystal grain boundary may contain an oxide such as $SiO_2$, $TiO_2$ or ZnO, a nitride such as SiN or TiN, a material such as carbon (C) or boron (B). The non-magnetic crystal grain boundary of the magnetic recording layer 5 preferably contains the same kind of compound as the grain boundary material of the second seed layer 4. For example, when a grain boundary material of the second seed layer 4 is an oxide, a non-magnetic grain boundary material of the magnetic recording layer 5 preferably contains an oxide. In the same way, combinations of carbon-carbon, carbide-carbide, or nitride-nitride are preferable. More preferably, the same compound as the grain boundary material of the second seed layer 4 is contained. For example, when a grain boundary material of the second seed layer is $Al_2 O_3$, a non-magnetic grain boundary material of the magnetic recording layer 5 preferably contains $Al_2 O_3$.

Alternatively, a non-magnetic crystal grain boundary of the magnetic recording layer 5 is preferably the boundary that forms a compound with a grain boundary material of the second seed layer 4. For example, when a grain boundary material of the second seed layer 4 is MgO or CaO, a non-magnetic grain boundary material of the magnetic recording layer 5 is preferably the material containing C. As a consequence, the non-magnetic grain boundary material of the magnetic recording layer 5 is formed actively on the grain boundary material of the second seed layer. Thus, a good granular structure is obtained.

Examples of preferable combinations of a grain boundary material of the second seed layer 4 and a non-magnetic crystal grain boundary of the magnetic recording layer 5 include, in the order of the grain boundary material and non-magnetic crystal grain boundary, $Al_2 O_3$ and $Al_2 O_3$, MgO and MgO, MgO and C, CaO and CaO, CaO and C, $Sc_2 O_3$ and $Sc_2 O_3$, SrO and SrO, $Y_2 O_3$ and $Y_2 O_3$, and the like.

Moreover, the magnetic recording layer 5 may be a single layer, or may be composed of plural magnetic recording layers 5. It is sufficient that magnetic recording layers 5 contains a layer contacting the second seed layer 4 and having a granular structure containing magnetic crystal grains composed of an ordered alloy. Layers not contacting the second seed layer 4 may have a non-granular structure, or may have a granular structure. As a layer containing a non-granular structure, a magnetic recording layer composed of a continuous layer, which is referred to as a magnetic cap layer, may be provided at an upper part of a magnetic recording layer having a granular structure. Furthermore, the magnetic recording layer 5 may have an ECC (Exchange-coupled Composite) structure obtained by sandwiching and laminating a bonding layer such as Ru with magnetic recording layers.

The magnetic recording layer 5 can be formed by depositing a predetermined material by a sputtering method. In the case where the magnetic recording layer 5 containing an ordered alloy is to be formed, a target containing a material for forming the ordered alloy can be used. In more detail, a target that contains elements at an intended ratio for composing the aforementioned ordered alloy can be used. Alternatively, the magnetic recording layer 5 may be formed using plural targets each containing a single element and adjusting powers to be applied to respective targets to thereby control a ratio of the elements. When the magnetic recording layer 5 having a granular structure is to be formed, a target containing a material for forming magnetic crystal grains and a material for forming a non-magnetic crystal grain boundary at an intended ratio can be used. Alternatively, a target containing a material for forming magnetic crystal grains and a target containing a material for forming a non-magnetic crystal grain boundary are used, and powers to be applied to respective targets are adjusted. The magnetic recording layer 5 may be formed by controlling in this way a composition ratio of magnetic crystal grains and a non-magnetic crystal grain boundary. Here, in the case where magnetic crystal grains are to be formed with an ordered alloy, plural targets individually containing an element for composing the ordered alloy may be used.

In the case where the magnetic recording layer 5 contains an ordered alloy, formation of the magnetic recording layer 5 involves heating of the substrate 1. Temperature of the substrate 1 on this occasion falls, for example, within a range from 300° C. to 600° C. Using this range of the substrate temperature allows to improve an order degree of the ordered alloy in the magnetic recording layer 5. Because of 300° C. or higher, the order degree of an $L1_0$ ordered alloy can be improved. Because of 600° C. or less, there is an effect of surface roughness to be suppressed.

Optionally, a protective layer (not illustrated) may be provided. The protective layer can be formed using a material used commonly in a field of magnetic recording media. Specifically, the protective layer can be formed using a non-magnetic metal such as Pt, a carbon-based material such as diamond-like carbon, or alternatively a silicon-based material such as silicon nitride. Moreover, the protective layer may be a single layer, or may have a laminated structure. A protective layer of a laminated structure may be, for example, a laminated structure of two kinds of carbon-based materials having different properties, a laminated structure of a metal and a carbon-based material, or a laminated structure of a metal oxide layer and a carbon-based material. The protective layer can be formed using any method known in the art, such as a sputtering method, a CVD method or a vacuum vapor deposition method.

Optionally, a liquid lubricant layer (not illustrated) may be provided. The liquid lubricant layer can be formed using a material for use commonly in a field of magnetic recording media. For example, a perfluoropolyether-based lubricant or the like can be used. The liquid lubricant layer can be formed using a coating method such as a dip coating method or a spin coating method.

EXAMPLES

[1] Summary of Examples and Comparative Examples

Table 1 shows a summary of Examples and Comparative Examples. As shown in Examples and Comparative Examples of Table 1, there are cases where a Ru—$TiO_2$ grain diameter control layer exists (Yes) or does not exist (No), and cases where a TiN—X second seed layer exists (Yes) or does not exist (No). Furthermore, there are cases where X is $Al_2 O_3$, MgO, C (carbon) or $ZrO_2$ and cases where X does not exist. Moreover, as to X in the second seed layer, there are cases where the addition amount thereof is varied in a range from 20 to 70 vol % (for some cases, a range up to 60 vol %). Meanwhile, in Examples and Comparative Examples of this application, as a principle, expression of "A-B" or the like means that formation is performed so that A and B coexist. Furthermore, expression of "A-C vol % B" or the like means that formation is performed so that B exists in C vol % relative to the total amount of A and B.

More specific layer configuration will be shown. First, the adhesion layer 6 composed of a Ni alloy (4 nm)/CrTi alloy (15 nm) is formed on the substrate 1 made of glass. On the

TABLE 1

Summary of Examples and Comparative Examples

| Example and Comparative Example | Grain diameter control layer Ru—TiO$_2$ layer | First seed layer Lamination of MgO/ZnO layers *1) | Second seed layer | | |
|---|---|---|---|---|---|
| | | | TiN-X layer | X material | Addition amount of X (vol %) |
| Example 1 | Yes | Yes | Yes | X = Al$_2$O$_3$ | 20, 30, 40, 50, 60, 70 |
| Example 2 | Yes | Yes | Yes | X = MgO | 20, 30, 40, 50, 60, 70 |
| Example 3 | Yes | Yes | Yes | X = C (carbon) | 40 |
| Comparative Example 1 | Yes | Yes | No | — | — |
| Comparative Example 2 | Yes | Yes | Yes | X not added *2) | 0 |
| Comparative Example 3 | No | Yes | Yes | X = Al$_2$O$_3$ | 20, 30, 40, 50, 60, 70 |
| Comparative Example 4 | No | Yes | Yes | X = MgO | 20, 30, 40, 50, 60, 70 |
| Comparative Example 5 | No | Yes | Yes | X not added | 0 |
| Comparative Example 6 | Yes | Yes | Yes | X = ZrO$_2$ | 20, 30, 40, 50, 60 |

*1) Lamination in which MgO is upper layer and ZnO is lower layer.
*2) Second seed layer is composed of TiN, and X is not added.

In Examples 1, 2, 3, a Ru—TiO$_2$ layer was formed as a grain diameter control layer, a MgO/ZnO layer was formed as a first seed layer, and a TiN—X layer was formed as a second seed layer. X=Al$_2$O$_3$ in Example 1, X=MgO in Example 2, and X=C (carbon) in Example 3. Meanwhile, expression such as A/B means that A is an upper layer and B is a lower layer.

On the other hand, in Comparative Example 1, although a Ru—TiO$_2$ layer is formed as a grain diameter control layer and a MgO/ZnO layer is formed as a first seed layer, a second seed layer is not formed. It is an example for confirming effectiveness of a second seed layer.

In Comparative Example 2, a second seed layer is composed of TiN, and X is not added. This is an example for confirming necessity of addition of X. The example corresponds to data in which an addition amount of X is 0 in Examples 1, 2, 3.

Comparative Examples 3, 4 correspond respectively to cases where a grain diameter control layer does not exist in Examples 1, 2. They are examples for confirming necessity of a grain diameter control layer.

In Comparative Example 5, a second seed layer is composed of TiN without the addition of X relative to Comparative Examples 3, 4.

In Comparative Example 6, X=ZrO$_2$ in a second seed layer relative to Example 1, 2, 3.

[2] Layer Configurations and Production Conditions in Examples and Comparative Examples Table 2 shows layer configurations and production conditions of Examples and Comparative Examples. Example 1 is used for showing an example of a specific layer configuration and a deposition method thereof. FIG. 2 shows an outline cross-sectional view of configuration of a magnetic recording medium in Example 1. As to the layer configuration in Example 1, as shown in FIG. 2, there are formed the adhesion layer 6, the orientation control layer 7, the grain diameter control layer 2, the non-magnetic intermediate layer 8, the first seed layer 3, the second seed layer 4 and the magnetic recording layer 5 in this order from the substrate 1 side.

layer 6, the orientation control layer 7 composed of Ru (6 nm)/Ru alloy (4 nm) is formed. On the layer 7, the grain diameter control layer 2 composed of Ru-25 vol % TiO$_2$ (1 nm) is formed. On the layer 2, the non-magnetic intermediate layer 8 composed of Pt-40 vol % TiO$_2$ (8 nm) is formed. On the layer 8, the first seed layer 3 composed of MgO (2 nm)/ZnO (2 nm) is formed. On the layer 3, the second seed layer 4 composed of TiN—Al$_2$ O$_3$ (5 nm) is formed. On the layer 4, the magnetic recording layer 5 composed of FePt-30 vol % C (4 nm) is formed. Meanwhile, expressions of A/B and the like means that A is an upper layer and B is a lower layer, and description in parentheses means film thickness.

A deposition method in Example 1 is as described in Table 2. Specifically, the substrate 1 made of glass was prepared and, from a lower layer in order, deposition was performed by sputtering. First, a CrTi alloy and Ni alloy were deposited as the adhesion layer 6, and a Ru alloy and Ru were deposited as the orientation control layer 7, in this order. Ru-25 vol % TiO$_2$ was deposited as the grain diameter control layer 2, and Pt-40 vol % TiO$_2$ was deposited as the non-magnetic intermediate layer 8, in this order. The depositions so far were performed by DC magnetron sputtering, using targets adjusted so as to deposit predetermined material compositions and adjusting power and gas pressure so as to give predetermined film thicknesses described in Table 2. Next, the first seed layer 3 was deposited by RF magnetron sputtering. As the first seed layer 3, a ZnO layer was deposited with power and gas pressure described in Table 2, the substrate was heated to 350° C. and subsequently a MgO layer was deposited with power and gas pressure described in Table 2. Furthermore, the second seed layer 4 was deposited by RF cosputtering using two targets of TiN and Al$_2$ O$_3$ in a state where the substrate was held at 350° C. A power amount on the Al$_2$ O$_3$ target side was fixed at 500 W and a power amount on the TiN target side was adjusted to thereby produce plural samples having different Al$_2$ O$_3$ amounts. Six samples respectively having an Al$_2$ O$_3$ amount of 20, 30, 40, 50, 60 and 70 vol % relative to the total amount of TiN and $Al_2O_3$ were produced. Finally, the substrate was heated to 450° C. and then FePt—C was deposited by DC magnetron sputtering as the magnetic recording layer 5. The deposition was performed with power and gas pressure described in Table 2 so as to give film thickness of 4 nm, using a target having been adjusted so that C was to be deposited in 30 vol % relative to the total amount of FePt—C.

In Example 2, TiN—MgO was used as the second seed layer relative to Example 1. In Example 3, TiN—C was used as the second seed layer and film thickness was 1 nm, relative to Example 1. Moreover, in Example 3, an amount of C was only 40 vol % relative to the total amount of TiN and C. In Comparative Example 1, the deposition was performed while removing the second seed layer, relative to Example 1. In Comparative Example 2, TiN was used as the second seed layer, relative to Example 1. In Comparative Example 3, the grain diameter control layer was removed and Pt was used as the non-magnetic intermediate layer, relative to Example 1. In Comparative Example 4, the grain diameter control layer was removed and Pt was used as the non-magnetic intermediate layer, relative to Example 2. In Comparative Example 5, TiN was used as the second seed layer, relative to Comparative Example 3. In Comparative Example 6, TiN—$ZrO_2$ was used as the second seed layer, relative to Example 1.

The relationships between a sample number and a second seed layer in Examples 1 to 3, and Comparative Examples 1 to 6 are shown in Tables 3 to 11.

TABLE 2

Layer configurations and production conditions in Examples and Comparative Examples

| Layer *1) configuration | Material | Film Thickness | Target | Power source | Power | Ar gas pressure | Substrate temperature in deposition |
|---|---|---|---|---|---|---|---|
| Substrate | Glass | 0.635 mm | — | — | — | — | — |
| Adhesion layer | CrTi alloy | 15 nm | CrTi alloy | DC | 1000 W | 1.0 Pa | Room temperature |
|  | Ni alloy | 4 nm | Ni alloy | DC | 500 W | 1.0 Pa | Room temperature |
| Orientation control layer | Ru alloy | 4 nm | Ru alloy | DC | 500 W | 1.0 Pa | Room temperature |
|  | Ru | 6 nm | Ru | DC | 750 W | 10.0 Pa | Room temperature |
| Grain diameter control layer | Ru - 25 vol % $TiO_2$ | 1 nm | Ru—$TiO_2$ | DC | 250 W | 1.0 Pa | Room temperature |
| Non-magnetic intermediate layer | Pt - 40 vol % $TiO_2$ | 8 nm | Pt—$TiO_2$ | DC | 250 W | 1.0 Pa | Room temperature |
| First seed layer | ZnO | 2 nm | ZnO | RF | 200 W | 0.3 Pa | Room temperature |
|  | MgO | 2 nm | MgO | RF | 500 W | 0.18 Pa | 350° C. |
| Second seed layer | TiN—X | 5 nm or *3) 1 nm | TiN X | TiN:RF X:RF | Adjusted *2) 500 W | 0.18 Pa | 350° C. |
| Magnetic recording layer | FePt - 30 vol % C | 4 nm | FePt—C | DC | 200 W | 1.0 Pa | 450° C. |

| Layer *1) configuration | Example 1~3 | Comparative Example 1 | Comparative Example 2 | Comparative Example 3, 4 | Comparative Example 5 | Comparative Example 6 |
|---|---|---|---|---|---|---|
| Substrate | Yes | Yes | Yes | Yes | Yes | Yes |
| Adhesion layer | Yes | Yes | Yes | Yes | Yes | Yes |
|  | Yes | Yes | Yes | Yes | Yes | Yes |
| Orientation control layer | Yes | Yes | Yes | Yes | Yes | Yes |
|  | Yes | Yes | Yes | Yes | Yes | Yes |
| Grain diameter control layer | Yes | Yes | Yes | No | No | Yes |
| Non-magnetic intermediate layer | Yes | Yes | Yes | Yes *4) | Yes *4) | Yes |
| First seed layer | Yes | Yes | Yes | Yes | Yes | Yes |
|  | Yes | Yes | Yes | Yes | Yes | Yes |
| Second seed layer | Yes | No | Yes *5) | Yes | Yes *5) | Yes *6) |
| Magnetic recording layer | Yes | Yes | Yes | Yes | Yes | Yes |

*1) Descried in order of processes. With regard to layer configuration, described from substrate side.
*2) Second seed layer was deposited by cosputtering. Total amount of X relative to total amount of TiN—X was controlled by fixing X target side at 500 W and adjusting power of TiN target.
*3) In Examples 1, 2 and Comparative Examples 2 to 5, film thickness was 5 nm. In Example 3, film thickness was 1 nm.
*4) Instead of Pt - 40 vol % $TiO_2$, Pt alone without $TiO_2$ addition.
*5) In TiN—X, X = 0 vol %. Substantially TiN only. X not added.
*6) In TiN—X, X = $ZrO_2$.

TABLE 3

Example 1

| Sample No. | Second seed layer |
|---|---|
| 1-1 | TiN-20 vol % $Al_2O_3$ |
| 1-2 | TiN-30 vol % $Al_2O_3$ |
| 1-3 | TiN-40 vol % $Al_2O_3$ |
| 1-4 | TiN-50 vol % $Al_2O_3$ |
| 1-5 | TiN-60 vol % $Al_2O_3$ |
| 1-6 | TiN-70 vol % $Al_2O_3$ |

TABLE 4

Example 2

| Sample No. | Second seed layer |
|---|---|
| 2-1 | TiN-20 vol % MgO |
| 2-2 | TiN-30 vol % MgO |
| 2-3 | TiN-40 vol % MgO |
| 2-4 | TiN-50 vol % MgO |
| 2-5 | TiN-60 vol % MgO |
| 2-6 | TiN-70 vol % MgO |

TABLE 5

Example 3

| Sample No. | Second seed layer |
|---|---|
| 3 | TiN-40 vol % C |

TABLE 6

Comparative Example 1

| Sample No. | Second seed layer |
|---|---|
| 4 | No |

TABLE 7

Comparative Example 2

| Sample No. | Second seed layer |
|---|---|
| 5 | TiN |

TABLE 8

Comparative Example 3

| Sample No. | Second seed layer |
|---|---|
| 6-1 | TiN-20 vol % $Al_2O_3$ |
| 6-2 | TiN-30 vol % $Al_2O_3$ |
| 6-3 | TiN-40 vol % $Al_2O_3$ |
| 6-4 | TiN-50 vol % $Al_2O_3$ |
| 6-5 | TiN-60 vol % $Al_2O_3$ |
| 6-6 | TiN-70 vol % $Al_2O_3$ |

TABLE 9

Comparative Example 4

| Sample No. | Second seed layer |
|---|---|
| 7-1 | TiN-20 vol % MgO |
| 7-2 | TiN-30 vol % MgO |
| 7-3 | TiN-40 vol % MgO |
| 7-4 | TiN-50 vol % MgO |
| 7-5 | TiN-60 vol % MgO |
| 7-6 | TiN-70 vol % MgO |

TABLE 10

Comparative Example 5

| Sample No. | Second seed layer |
|---|---|
| 8 | TiN |

TABLE 11

Comparative Example 6

| Sample No. | Second seed layer |
|---|---|
| 10-1 | TiN-20 vol % $ZrO_2$ |
| 10-2 | TiN-30 vol % $ZrO_2$ |
| 10-3 | TiN-40 vol % $ZrO_2$ |
| 10-4 | TiN-50 vol % $ZrO_2$ |
| 10-5 | TiN-60 vol % $ZrO_2$ |

[3] Evaluation Technique for Examples and Comparative Examples

A grain structure of a film surface parallel to the substrate was observed from the direction perpendicular to the substrate, with a scanning electron microscope (SEM). The SEM observation was performed at a magnification of four hundred thousand and an acceleration voltage of 15 kV. Moreover, in images obtained by the SEM observation, grains and regions of grain boundary were separated from a region of 300 nm in width×200 nm in height by image processing using image analysis software (trade name: Win-Roof, manufactured by Mitani Corporation), and grain diameter analysis was performed. In the grain diameter analysis, a grain diameter on the basis of a circle equivalent diameter was calculated for separated every grain. An average grain diameter <D> as an average value of all the grain diameters, a grain diameter dispersion σ as a variance of all the grain diameters were calculated.

Dependency of spontaneous magnetization on a magnetic field application angle was evaluated using a PPMS apparatus (trade name: Physical Property Measurement System, manufactured by Quantum Design Inc.), and a magnetic anisotropy constant Ku at a desired temperature was determined. In the determination of the magnetic anisotropy constant Ku, techniques described in R. F. Penoyer, "Automatic Torque Balance for Magnetic Anisotropy Measurements," The Review of Scientific Instruments, Vol 30 No. 8, 711-714, August 1959; and Chikazumi Soshin, "Physics of Ferromagnetism" (Vol. 2) 10-21, Shokabo Co., Ltd. were used.

Moreover, a magnetization curve was measured using a vibration sample type magnetometer (VSM), and coercive force was evaluated. The magnetization curve was measured with regard to a surface perpendicular to the substrate.

[4] Comparison Between Examples 1, 2, 3 and Comparative Example 1

To verify an effect of the second seed layer, comparison was performed among a second seed layer composed of TiN-40 vol % $Al_2O_3$ (Example 1, sample number: 1-3), a second seed layer composed of TiN-40 vol % MgO (Example 2, sample number: 2-3), a second seed layer composed of TiN-40 vol % C (Example 3, sample number: 3), and a sample having no second seed layer (Comparative Example 1, sample number: 4). Results of SEM observation are shown in FIGS. 3 to 6, and results of grain diameter analyses and results of magnetic anisotropy constants are shown in Table 12.

Figure 3:
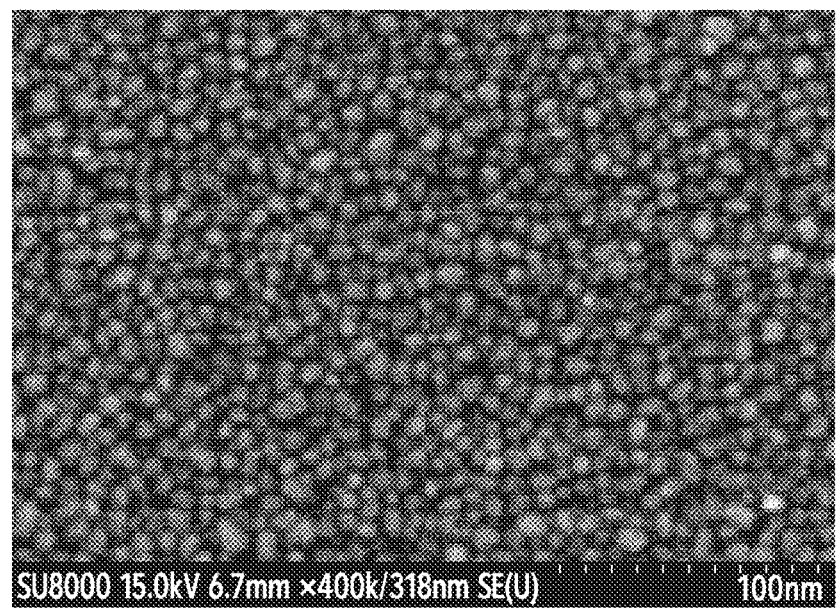
FIG. 3 is a SEM photograph of sample number=1-3 in Example 1.
Figure 4:
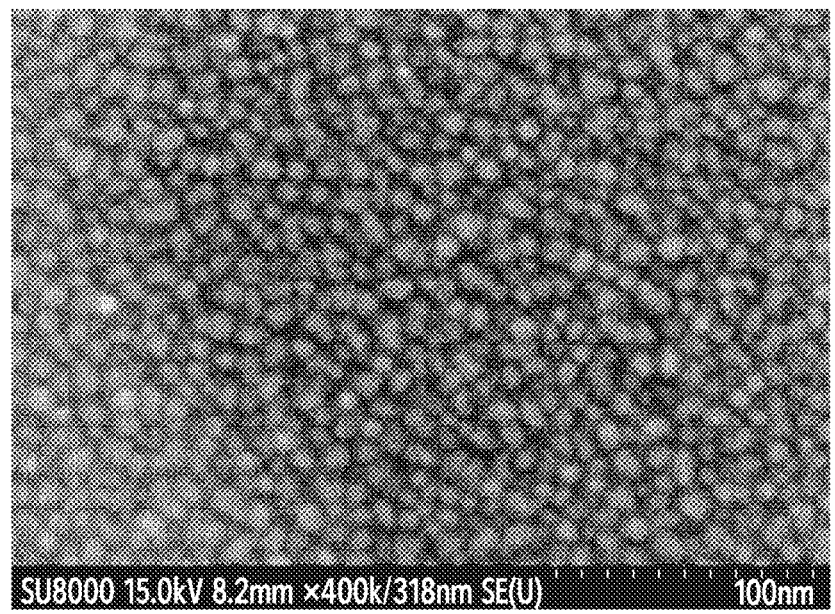
FIG. 4 is a SEM photograph of sample number=2-3 in Example 2.
Figure 5:
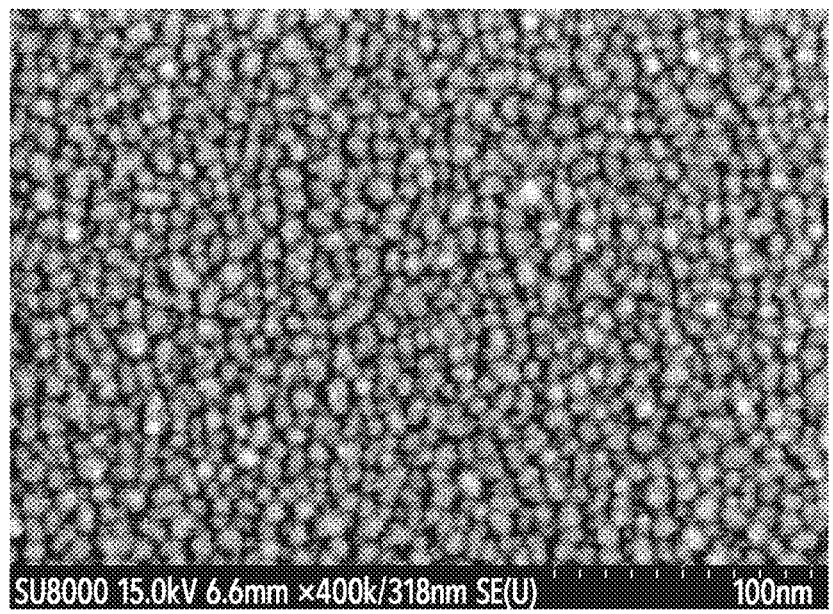
FIG. 5 is a SEM photograph of sample number=3 in Example 3.
Figure 6:
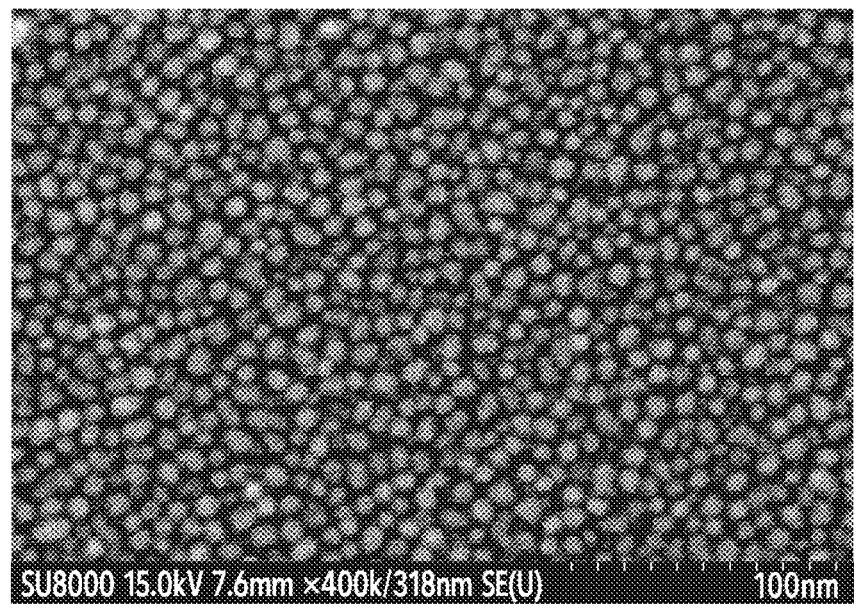
FIG. 6 is a SEM photograph of sample number=4 in Comparative Example 1.

FIG. 3 is an SEM photograph of sample number=1-3 in Example 1. FIG. 4 is an SEM photograph of sample number=2-3 in Example 2. FIG. 5 is an SEM photograph of sample number=3 in Example 3. FIG. 6 is an SEM photograph of sample number=4 in Comparative Example 1.

TABLE 12

Average grain diameter and grain diameter dispersion of FePt and magnetic anisotropy constant Ku of FePt layer

| Example and Comparative Example | Sample No. | Second seed layer | Average grain diameter <D> (nm) | Grain diameter dispersion σ (nm) | Magnetic anisotropy constant Ku (erg/cm³) |
|---|---|---|---|---|---|
| Example 1 | 1-3 | TiN-40 vol % $Al_2O_3$ | 6.85 | 1.86 | 1.2E+07 |
| Example 2 | 2-3 | TiN-40 vol % MgO | 7.93 | 2.30 | 1.0E+07 |
| Example 3 | 3 | TiN-40 vol % C | 7.30 | 2.01 | 1.1E+07 |
| Comparative Example 1 | 4 | No | 8.32 | 2.60 | 1.0E+07 |

Comparisons of Average Grain Diameters, and Grain Diameter Dispersions

As shown in SEM photographs of FIGS. 3 to 6, Examples 1 to 3 and Comparative Example 1 each show that a distinct granular structure was formed. As a consequence of comparison of grain diameters, it is found that grain diameters have been made small in whole Examples 1 to 3 relative to Comparative Example 1. As shown in Table 12, Comparative Example 1 in which no second seed layer was formed shows that the average grain diameter in the magnetic recording layer was 8.3 nm and that the grain diameter dispersion was 2.6 nm. In contrast, Examples 1, 2, 3 in which a second seed layer was composed of TiN—$Al_2O_3$, TiN—MgO, or TiN—C show that average grain diameters in the magnetic recording layer have been reduced to 6.9 nm, 7.9 nm or 7.3 nm and that the grain diameter dispersion also could be made small to 1.9 nm, 2.3 nm or 2.0 nm.

Comparison of Magnetic Properties (Magnetic Anisotropy Energies)

As shown in Table 12, the magnetic anisotropy constant Ku was equivalent or was improved slightly. Moreover, all Examples 1, 2, 3 represented Ku of $1.0 \times 10^7$ erg/cm³ or higher, which confirmed their applicability as magnetic recording media.

From these results, it was found that formation of a second seed layer composed of TiN—$Al_2O_3$, TiN—MgO or TiN—C between a MgO/ZnO first seed layer and an FePt magnetic recording layer did not involve any deterioration of a magnetic property (magnetic anisotropy energy). It is found preferable that in this way an average grain diameter of magnetic crystal grains and grain diameter dispersion in a magnetic recording layer can be made small.

[5] Comparison Between Example 1 and Comparative Example 2

[5-1] Sample for Showing Effect of X=$Al_2O_3$ in Second Seed Layer

Example 1 is an example containing a second seed layer composed of TiN—$Al_2O_3$. To show the optimum addition amount of $Al_2O_3$, plural samples (sample numbers: 1-1 to 1-6) having different addition amounts of $Al_2O_3$ in Example 1 were produced. Comparative Example 2 is an example of containing a second seed layer composed of TiN without addition of $Al_2O_3$ (sample number: 5).

Figure 7:
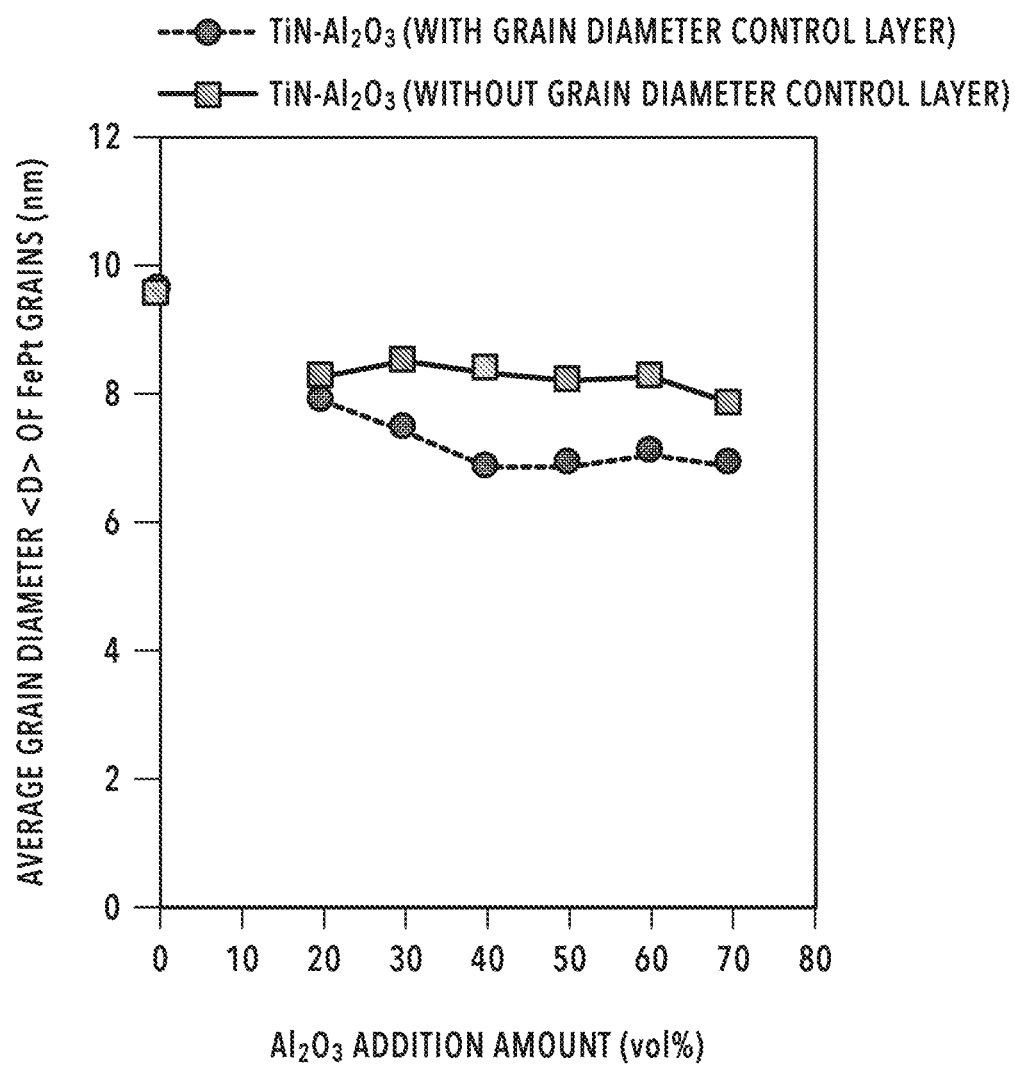
FIG. 7 shows a comparison of average grain diameters between Example 1 and Comparative Examples 2, 3, 5.
Figure 8:
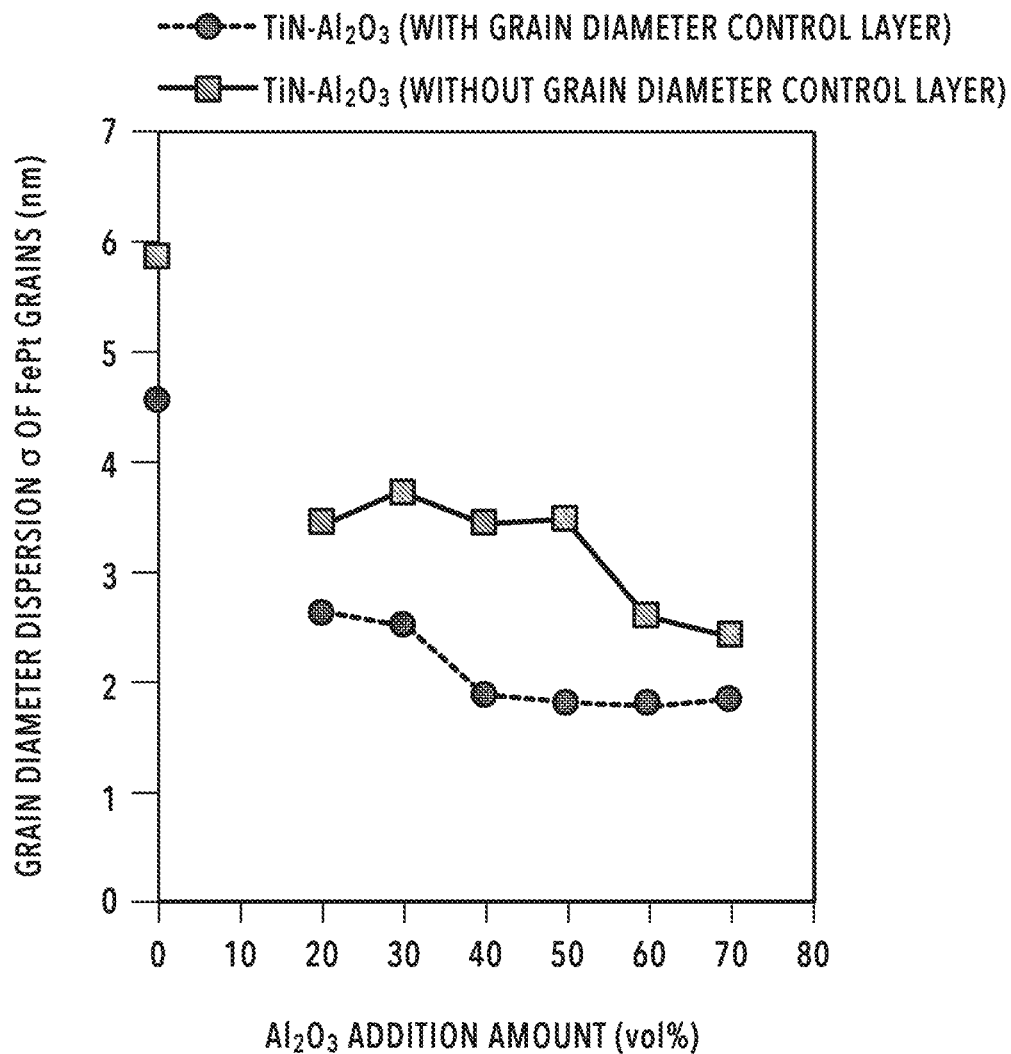
FIG. 8 shows a comparison of grain diameter dispersions between Example 1 and Comparative Examples 2, 3, 5.
Figure 9:
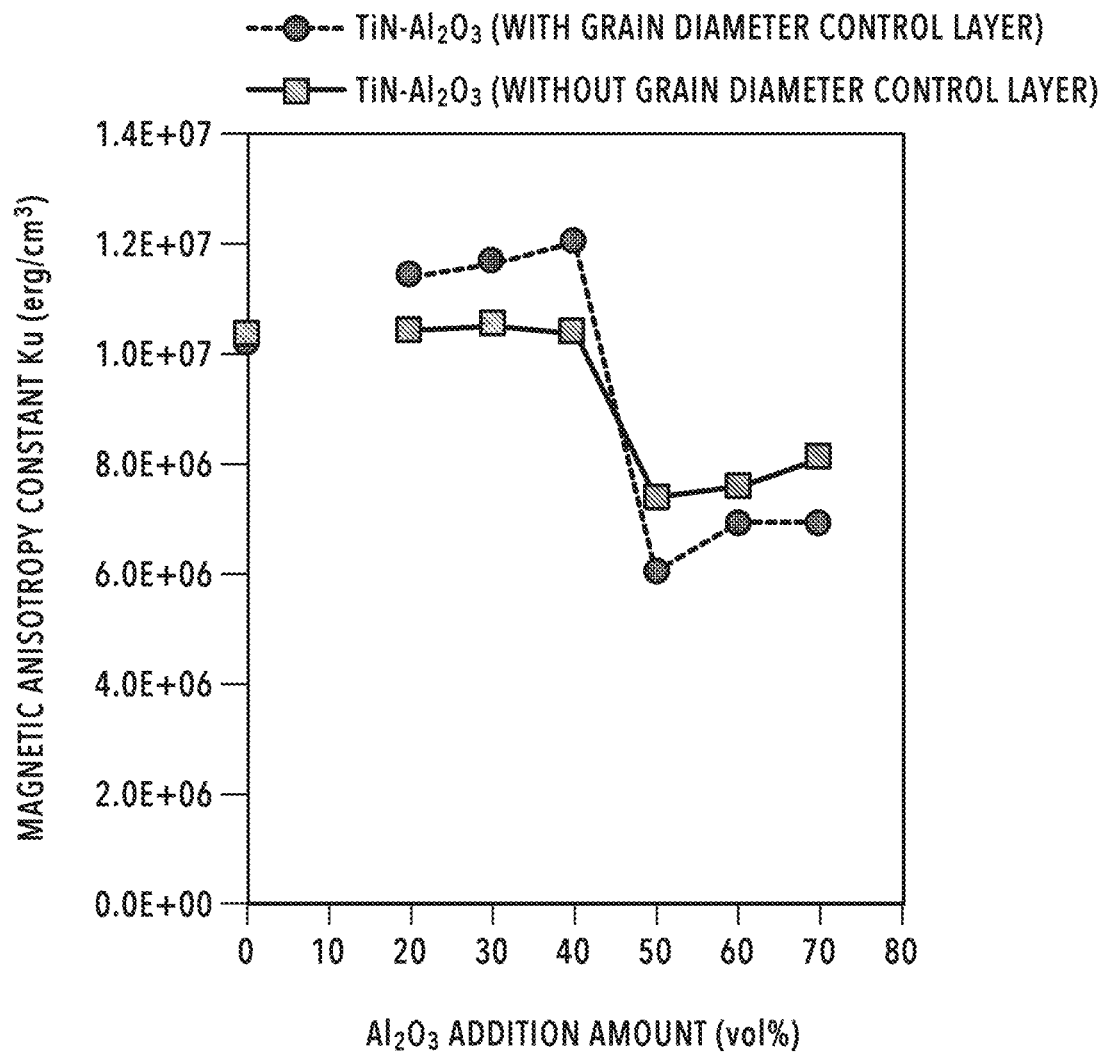
FIG. 9 shows a comparison of magnetic anisotropy constants between Example 1 and Comparative Examples 2, 3, 5.
Figure 10:
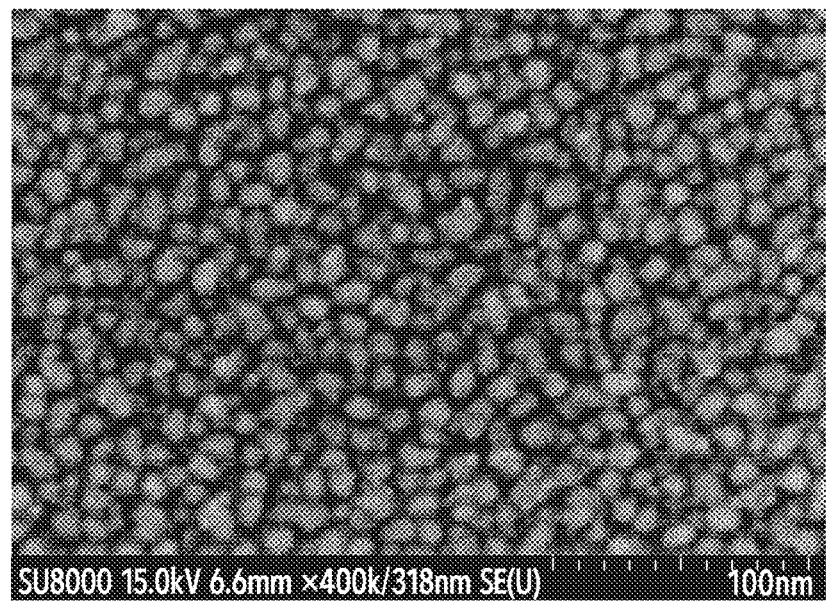
FIG. 10 is a SEM photograph of sample number=5 in Comparative Example 2.

Table 13 and FIGS. 3, 7 to 10 show results at respective addition amounts of $Al_2O_3$. FIG. 3 is a SEM photograph of sample number=1-3 in Example 1. Circles in FIG. 7 show comparison of average grain diameters between Example 1 and Comparative Example 2. Circles in FIG. 8 show comparison of grain diameter dispersions between Example 1 and Comparative Example 2. Circles in FIG. 9 show comparison of magnetic anisotropy constants between Example 1 and Comparative Example 2. FIG. 10 is a SEM photograph of sample number=5 in Comparative Example 2.

TABLE 13

Average grain diameter and grain diameter dispersion of FePt and magnetic anisotropy constant Ku of FePt layer

| Example and Comparative Example | Sample No. | $Al_2O_3$ addition amount (vol %) | Average grain diameter <D> (nm) | Grain diameter dispersion σ (nm) | Magnetic anisotropy constant Ku (erg/cm³) |
|---|---|---|---|---|---|
| Comparative Example 2 | 5 | 0 | 9.66 | 4.55 | 1.0E+07 |
| Example 1 | 1-1 | 20 | 7.87 | 2.61 | 1.1E+07 |
| | 1-2 | 30 | 7.41 | 2.50 | 1.2E+07 |
| | 1-3 | 40 | 6.85 | 1.86 | 1.2E+07 |
| | 1-4 | 50 | 6.87 | 1.79 | 6.1E+06 |
| | 1-5 | 60 | 7.06 | 1.77 | 6.9E+06 |
| | 1-6 | 70 | 6.89 | 1.82 | 6.9E+06 |

[5-2] Effect of X=$Al_2O_3$ in Second Seed Layer

The magnetic recording layer of the sample using TiN without addition of $Al_2O_3$ in the second seed layer (Comparative Example 2) contains coarse and angular agglomerated grains in which plural minute grains agglutinate, as shown by the SEM photograph in FIG. 10. As shown in Table 13, an average grain diameter and grain diameter dispersion were about 9.7 nm and 4.6 nm, respectively. In contrast, a magnetic recording layer of a sample in which the second seed layer is composed of TiN—$Al_2O_3$ (Example 1, sample number: 1-3) has a granular structure composed of minute grains, as shown by the SEM photograph in FIG. 3. Moreover, as shown in Table 13, an average grain diameter and grain diameter dispersion were about 6.9 nm and 1.9 nm, respectively. It is found that both average grain diameter and grain diameter dispersion are reduced with TiN—$Al_2O_3$.

In a sample that was formed up to the grain diameter control layer in the same procedure as in Example 1, an average grain diameter observed at a grain diameter control layer surface was about 7 nm. In other words, in sample number: 1-3 in this Example 1, an average grain diameter in the magnetic recording layer and an average grain diameter in the grain diameter control layer were approximately the same. It means that the use of TiN—$Al_2O_3$ as the second seed layer made an average grain diameter in the magnetic recording layer come closer to an average grain diameter in the grain diameter control layer, as compared with the use of TiN without addition of $Al_2O_3$. This is due to the result that using TiN—$Al_2O_3$ as the second seed layer provided a granular structure of the magnetic recording layer which reflects the granular structure of the grain diameter control layer.

[5-3] Optimum Range of $Al_2O_3$ Amount in X=$Al_2O_3$ of Second Seed Layer

As shown with circles in FIG. 7, circles in FIG. 8 and in Table 3, the average grain diameters and grain diameter dispersions decrease as the $Al_2O_3$ addition amounts increase, up to an $Al_2O_3$ addition amount of 40 vol %.

As shown with circles in FIG. 7, the average grain diameter decreases toward 7 nm that is the grain diameter in the grain diameter control layer in line with an $Al_2O_3$ amount up to the $Al_2O_3$ addition amount of 40 vol %. At 40 vol %, the average grain diameter becomes equivalent to 7 nm that is the average grain diameter in the grain diameter control layer. Between 40 vol % and 70 vol %, the average grain diameter becomes constant at 7 nm that is equivalent to the average grain diameter in the grain diameter control layer.

As shown with circles in FIG. 8, the grain diameter dispersion decreases greatly by adding $Al_2O_3$, compared with the case of no addition. Furthermore, the grain diameter dispersion continuously decreases in line with an $Al_2O_3$ addition amount up to the addition amount of 40 vol %. Between 40 vol % and 70 vol %, the grain diameter dispersion becomes constant at around 1.8 nm.

As shown with circles in FIG. 9 and in Table 13, a magnetic property (magnetic anisotropy constant) raises up to the $Al_2O_3$ addition amount of 40 vol %. It lowers greatly at 50 vol %. Between 50 vol % and 70 vol %, it falls below $1.0 \times 10^7$ erg/cm$^3$. The improvement of the magnetic anisotropy constant due to the increase up to 40 vol % is a result of decrease of a crystallographic defect due to a bridge of a grain boundary in the lower layer thereby providing a good crystallinity of the magnetic recording layer. On the other hand, as to the reason why the magnetic anisotropy constant decreased at 50 vol % or more, it is considered that a too large $Al_2O_3$ addition amount caused insufficient segregation at grain boundaries and led to segregation at an interface between the second seed layer and the magnetic recording layer thereby hindering heteroepitaxial growth of FePt in the magnetic recording layer. Moreover, at 50 vol % or more, the magnetic property falls below $1.0 \times 10^7$ erg/cm$^3$, which is to be a reference for an application to a magnetic recording medium.

As described above, as $Al_2O_3$ is added to TiN, the grain structure of the magnetic recording layer tends to reflect the grain structure of the grain diameter control layer so that the average grain diameter and grain diameter dispersion are reduced and magnetic properties are improved. However, if an $Al_2O_3$ addition amount is made to 50 vol % or more, there are no decrease of an average grain diameter and grain diameter dispersion, and magnetic properties deteriorate. Therefore, an $Al_2O_3$ addition amount is preferably less than 50 vol %.

[6] Comparison Between Example 1 and Comparative Examples 2, 3, 5

[6-1] Samples for Showing Necessity of Grain Diameter Control Layer

The layer configuration in Example 1 is an example of inclusion of a grain diameter control layer composed of Ru—$TiO_2$ and a second seed layer composed of TiN—$Al_2O_3$. The layer configuration in Comparative Example 3 is an example of containing no grain diameter control layer and containing a second seed layer composed of TiN—$Al_2O_3$, to show the necessity of the grain diameter control layer. In the same way as in Example 1, plural samples (sample numbers: 6-1 to 6-6) having different $Al_2O_3$ addition amounts were produced.

Layer configurations of Comparative Example 2 and Comparative Example 5 are those in which the second seed layer is composed of TiN without $Al_2O_3$ addition, compared to Example 1 and Comparative Example 3.

Figure 11:
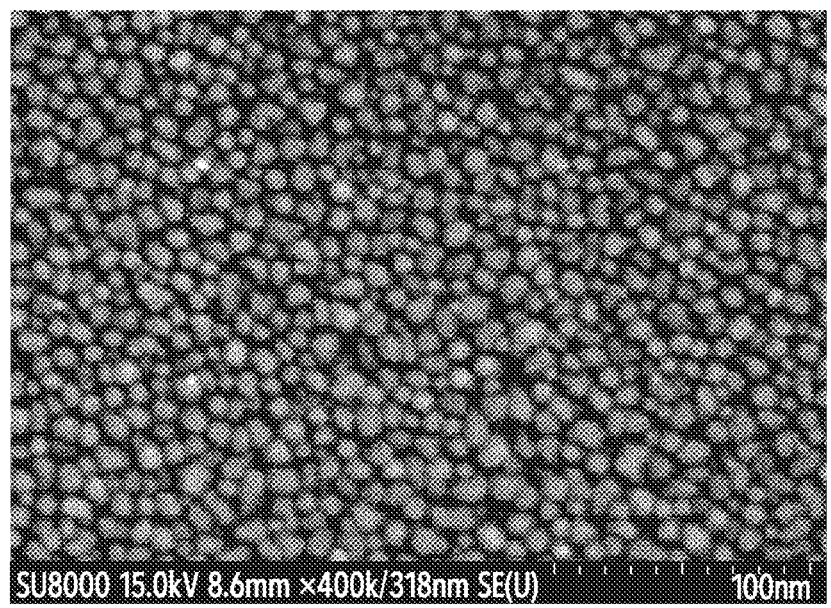
FIG. 11 is a SEM photograph of sample number=6-3 in Comparative Example 3.

Table 14 and FIGS. 7 to 9, 11 show results of respective $Al_2O_3$ addition amounts. FIG. 11 is a SEM photograph of sample number=6-3 in Comparative Example 3. Squares in FIG. 7 show average grain diameters in Comparative Examples 3, 5. Squares in FIG. 8 show grain diameter dispersions in Comparative Examples 3, 5. Squares in FIG. 9 show magnetic anisotropy constants in Comparative Examples 3, 5.

TABLE 14

Average grain diameter and grain diameter dispersion of FePt and magnetic anisotropy constant Ku of FePt layer

| Example and Comparative Example | Sample No. | $Al_2O_3$ addition amount (vol %) | Average grain diameter <D> (nm) | Grain diameter dispersion σ (nm) | Magnetic anisotropy constant Ku (erg/cm$^3$) |
|---|---|---|---|---|---|
| Comparative Example 5 | 8 | 0 | 9.51 | 5.84 | 1.0E+07 |
| Comparative Example 3 | 6-1 | 20 | 8.24 | 3.42 | 1.0E+07 |
|  | 6-2 | 30 | 8.50 | 3.71 | 1.1E+07 |
|  | 6-3 | 40 | 8.34 | 3.41 | 1.0E+07 |
|  | 6-4 | 50 | 8.17 | 3.45 | 7.4E+06 |
|  | 6-5 | 60 | 8.24 | 2.57 | 7.6E+06 |
|  | 6-6 | 70 | 7.81 | 2.39 | 8.1E+06 |

[6-2] Effect of Grain Diameter Control Layer

In the case where a TiN—$Al_2O_3$ second seed layer is made on a layer without containing a grain diameter control layer (Comparative Example 3, sample number=6-3), the magnetic recording layer becomes a state in which minute grains of several nanometers in grain diameter and huge grains of several tens nanometers in grain diameter coexist, as shown in a SEM photograph in FIG. 11. It does not form a magnetic recording layer having a granular structure composed of uniform grains, as in the case in FIG. 3 of the magnetic recording layer being formed on the layer containing the grain diameter control layer (Example 1, sample number=1-3).

As shown with circles and squares in FIG. 7, average grain diameters of crystal grains in magnetic recording layers in the cases (Comparative Examples 2, 5) where $Al_2O_3$ is not contained in the second seed layer are 9.7 nm for the sample containing the grain diameter control layer (circles) and 9.5 nm for the sample not containing a grain diameter control layer (squares), both of which are large in the same degree.

An average grain diameter of crystal grains of the magnetic recording layer of a sample without containing a grain diameter control layer (Comparative Example 3) decreases to around 8 nm by adding $Al_2O_3$, as shown with squares in FIG. 7. However, the average grain diameter does not become small even if an $Al_2O_3$ addition amount is varied. The average grain diameter is larger compared to the sample (Example 1) containing the grain diameter control layer shown with circles in FIG. 7.

A grain diameter dispersion of crystal grains in the magnetic recording layer of the sample without containing a grain diameter control layer (Comparative Example 3) decreases only to 3.4 nm even if $Al_2O_3$ is added, as shown with squares in FIG. 8. However, even if an addition amount of $Al_2O_3$ is varied, the grain diameter dispersion is only at a level of around 2.5 to 3.5 nm. A grain diameter dispersion is also large compared to the sample containing the grain diameter control layer (Example 1) shown with circles in FIG. 8. Addition of up to 40 vol % does not cause a grain diameter dispersion of less than 3 nm, which is a reference for an application to a magnetic recording medium. This means that it cannot be used as a magnetic recording medium.

A magnetic anisotropy constant of the sample without containing a grain diameter control layer (Comparative Example 3) does not show substantial change until 40 vol % of $Al_2O_3$ addition amounts, as shown with squares in FIG. 9, while it deteriorates greatly at 50 vol % or more. It does not show any improvement of the magnetic anisotropy constant up to 40 vol %, as observed in the sample containing the grain diameter control layer (Example 1) shown with circles in FIG. 9. Moreover, in 50 vol % or more, the magnetic anisotropy constant has fallen below $1.0 \times 10^7$ erg/cm$^3$ that is a reference for an application to a magnetic recording medium.

As described above, in the cases of containing the TiN—$Al_2O_3$ second seed layer and without forming a grain diameter control layer, it is not possible to obtain what satisfies both grain diameter dispersion and magnetic anisotropy constant applicable to a magnetic recording medium. In the cases containing the TiN—$Al_2O_3$ second seed layer, as a consequent of formation of the grain diameter control layer, both average grain diameter and grain diameter dispersion of magnetic crystal grains of the magnetic recording layer can be made small remarkably, and the magnetic anisotropy constant can also be improved.

[7] Comparison Between Example 2 and Comparative Example 2

[7-1] Samples for Showing Effect of X=MgO in Second Seed Layer

Example 2 is an example containing a second seed layer composed of TiN—MgO. To show the optimum MgO addition amount, plural samples having different MgO addition amounts (sample numbers: 2-1 to 2-6) were prepared in Example 2. Comparative Example 2 is an example (sample number: 5) containing a second seed layer composed of TiN without addition of MgO.

Figure 12:
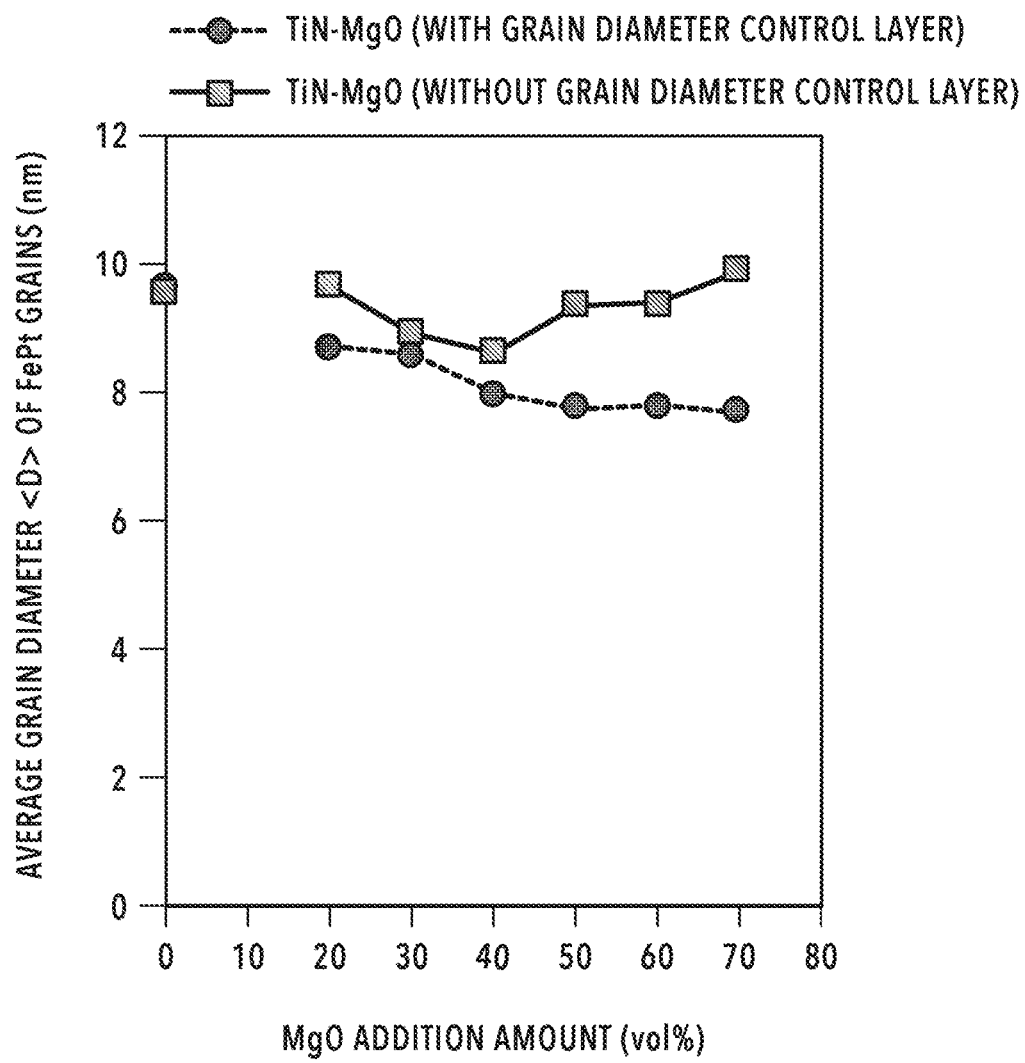
FIG. 12 shows a comparison of average grain diameters between Example 2 and Comparative Examples 2, 4, 5.
Figure 13:
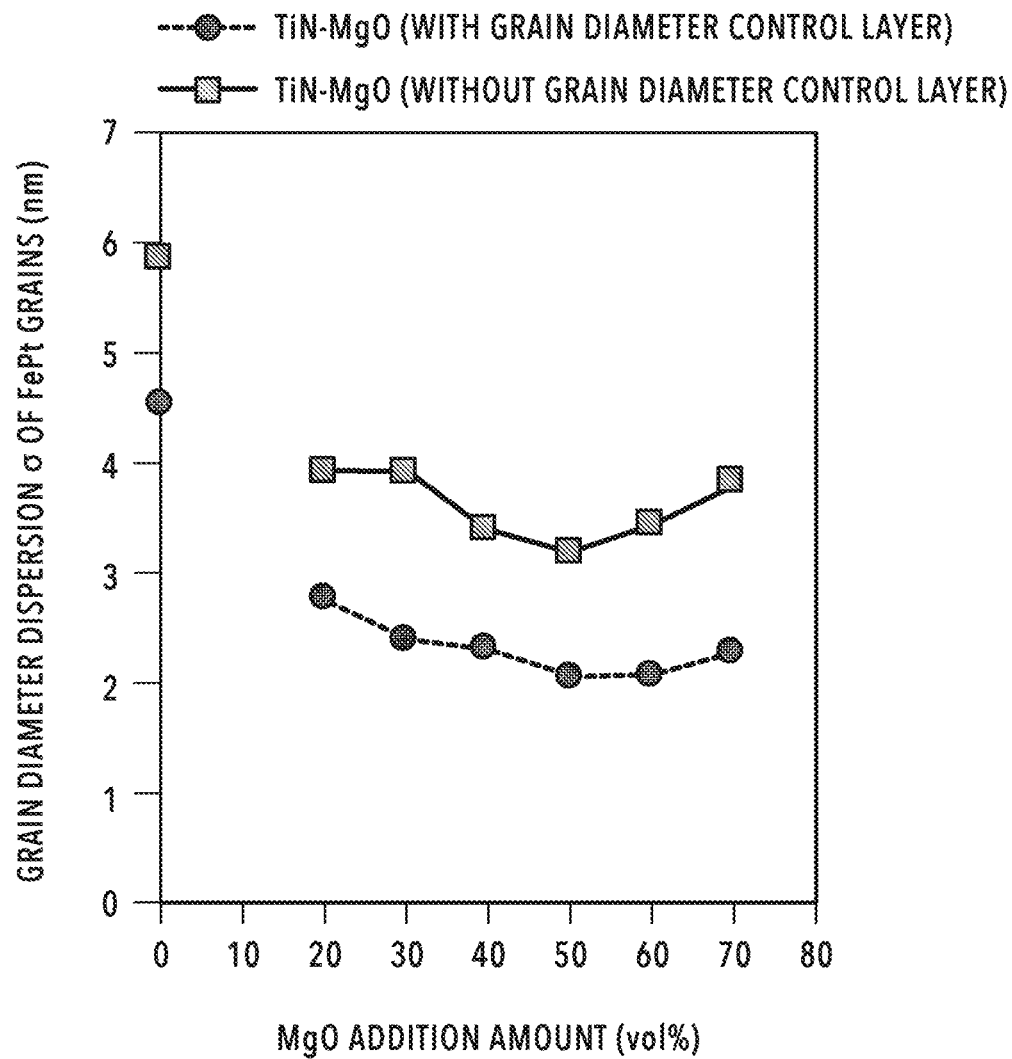
FIG. 13 shows a comparison of grain diameter dispersions between Example 2 and Comparative Examples 2, 4, 5.
Figure 14:
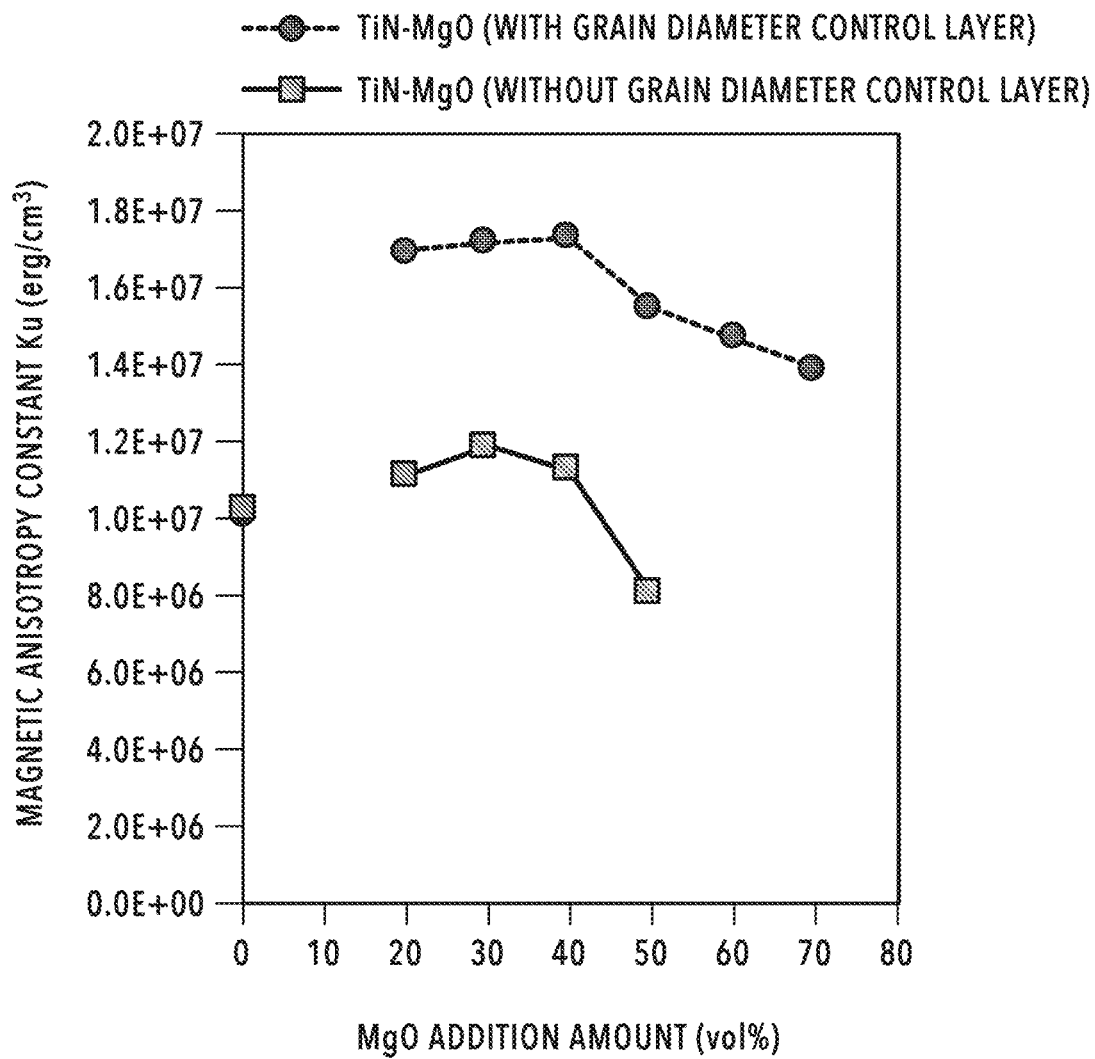
FIG. 14 shows a comparison of magnetic anisotropy constants between Example 2 and Comparative Examples 2, 4, 5.

Table 15 and FIGS. 4, 12 to 14 show results at respective addition amounts. FIG. 4 is a SEM photograph of sample number=2-3 in Example 2. FIG. 12 shows a comparison of average grain diameters between Example 2 and Comparative Example 2. FIG. 13 shows a comparison of grain diameter dispersions between Example 2 and Comparative Example 2. FIG. 14 shows a comparison of magnetic anisotropy constants between Example 2 and Comparative Example 2. FIG. 10 is a SEM photograph of sample number=5 in Comparative Example 2.

TABLE 15

Average grain diameter and grain diameter dispersion of FePt and magnetic anisotropy constant Ku of FePt layer

| Example and Comparative Example | Sample No. | MgO addition amount (vol %) | Average grain diameter <D> (nm) | Grain diameter dispersion σ (nm) | Magnetic anisotropy constant Ku (erg/cm$^3$) |
|---|---|---|---|---|---|
| Comparative Example 2 | 5 | 0 | 9.66 | 4.55 | 1.0E+07 |
| Example 2 | 2-1 | 20 | 8.67 | 2.76 | 1.7E+07 |
| | 2-2 | 30 | 8.57 | 2.38 | 1.7E+07 |
| | 2-3 | 40 | 7.93 | 2.30 | 1.7E+07 |
| | 2-4 | 50 | 7.74 | 2.04 | 1.6E+07 |
| | 2-5 | 60 | 7.76 | 2.07 | 1.5E+07 |
| | 2-6 | 70 | 7.68 | 2.28 | 1.4E+07 |

[7-2] Effect of Addition of MgO to Second Seed Layer

The magnetic recording layer in the sample (Comparative Example 2) in which TiN without the addition of MgO is used in the second seed layer contains, as shown by a SEM photograph in FIG. 10, coarse and angular agglomerated grains in which plural minute grains agglutinate. As shown in Table 15, the average grain diameter and grain diameter dispersion were about 9.7 nm and 4.6 nm, respectively. In contrast, the magnetic recording layer of the sample (Example 2, sample number: 2-3) having the second seed layer composed of TiN—MgO has, as shown by a SEM photograph in FIG. 4, a granular structure composed of minute grains. Moreover, as shown in Table 15, the average grain diameter and grain diameter dispersion were about 7.9 nm and 2.3 nm, respectively. It is found that, with TiN—MgO, both average grain diameter and grain diameter dispersion are reduced.

A sample was formed up to the grain diameter control layer in the same procedure as in Example 1. Its average grain diameter, which was observed on the grain diameter control layer surface, was about 7 nm. It means that an average grain diameter of magnetic crystal grains in the magnetic recording layer has come closer to the average grain diameter in the grain diameter control layer, as a consequence of addition of MgO to TiN in the second seed layer, as compared with the case where MgO is not added. This is due to the result that using TiN—$Al_2O_3$ in the second seed layer provided a good granular structure of the magnetic recording layer, reflecting the granular structure of the grain diameter control layer.

[7-3] Optimum Range of MgO Amount of X=MgO in Second Seed Layer

As shown with circles in FIG. 12, circles in FIG. 13, and in Table 15, in a MgO addition amount up to 50 vol %, an average grain diameter and grain diameter dispersion decrease as increase in a MgO addition amount.

As shown with circles in FIG. 12, the average grain diameter decreases toward 7 nm that is the grain diameter in the grain diameter control layer up to 50 vol % of the MgO addition amount in line with the MgO addition amount, and becomes 7.7 nm in average grain diameter at 50 vol %. Between 50 vol % and 70 vol %, the average grain diameter becomes constant at around 7.7 nm.

As shown with circles in FIG. 13, the grain diameter dispersion decreases remarkably as a consequence of addition of MgO, as compared with the case without the addition. Furthermore, it continuously decreases up to 50 vol % of the addition amount in line with a MgO addition amount. In between 50 vol % and 70 vol %, the grain diameter dispersion becomes constant at around 2 nm.

As shown with circles in FIG. 14 and in Table 15, the magnetic property (magnetic anisotropy constant) raises in a MgO addition amount up to 40 vol %. It decreases at 50 vol %, and gradually decreases between 50 vol % and 70 vol %. The improvement of the magnetic anisotropy constant up to 40 vol % is a result of decrease of a crystallographic defect due to a bridge of a grain boundary in the lower layer thereby providing good crystallinity of the magnetic recording layer. On the other hand, as to the reason why the magnetic anisotropy constant decreased at 50 vol % or more, it is considered that a too large MgO addition amount caused insufficient segregation at grain boundaries and led to segregation at an interface between the second seed layer and the magnetic recording layer thereby hindering heteroepitaxial growth of FePt in the magnetic recording layer.

As described above, as MgO is added to TiN, the grain structure of the magnetic recording layer tends to reflect the grain structure of the grain diameter control layer so that the average grain diameter and grain diameter dispersion are reduced and the magnetic properties are improved. However, in the cases where a MgO addition amount is 50 vol % or more, the magnetic property deteriorates. Therefore, a MgO addition amount is preferably less than 50 vol %.

[8] Comparison Between Example 2 and Comparative Examples 2, 4, 5

[8-1] Samples for Showing Necessity of Grain Diameter Control Layer

The layer configuration in Example 2 is an example containing a grain diameter control layer composed of Ru—$TiO_2$ and a second seed layer composed of TiN—MgO. The layer configuration in Comparative Example 4 is an example without a grain diameter control layer while containing a second seed layer composed of TiN—MgO, for the purpose of showing necessity of a grain diameter control layer. In the same way as in Example 2, plural samples (sample numbers: 7-1 to 7-6) having different MgO addition amounts were prepared.

Layer configurations in Comparative Example 2 and Comparative Example 5 are such that second seed layers are composed of TiN without the addition of MgO, compared to Example 2 and Comparative Example 4.

Figure 15:
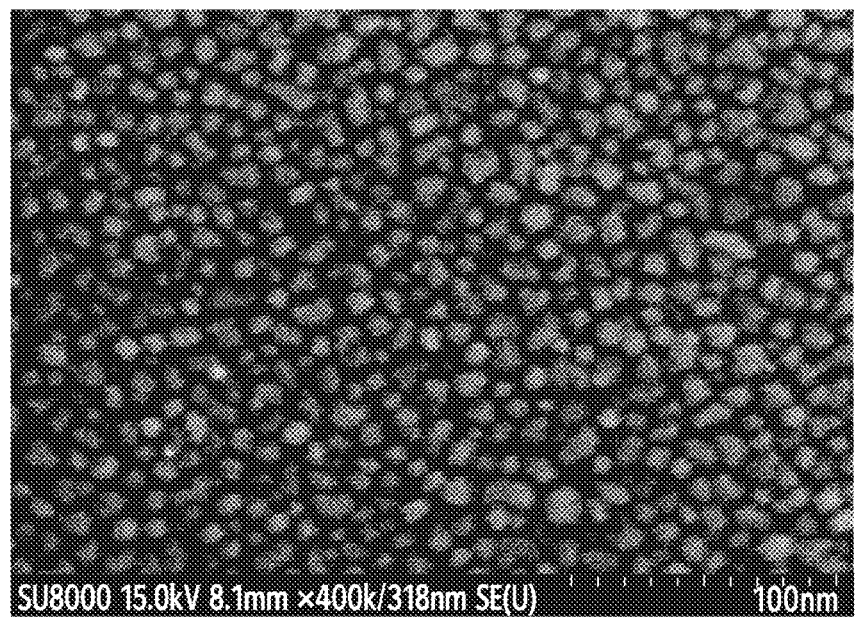
FIG. 15 is a SEM photograph of sample number=7-3 in Comparative Example 4.

Table 16, and FIGS. 12 to 15 show results at respective MgO addition amounts. FIG. 15 is a SEM photograph of sample number=7-3 in Comparative Example 4. Squares in FIG. 12 show average grain diameters in Comparative Examples 4, 5. Squares in FIG. 13 show grain diameter dispersions in Comparative Examples 4, 5. Squares in FIG. 14 show magnetic anisotropy constants in Comparative Examples 4, 5.

TABLE 16

Average grain diameter and grain diameter dispersion of FePt and magnetic anisotropy constant Ku of FePt layer

| Example and Comparative Example | Sample No. | MgO addition amount (vol %) | Average grain diameter <D> (nm) | Grain diameter dispersion σ (nm) | Magnetic anisotropy constant Ku (erg/cm$^3$) |
|---|---|---|---|---|---|
| Comparative Example 5 | 8 | 0 | 9.51 | 5.84 | 1.0E+07 |
| Comparative Example 4 | 7-1 | 20 | 9.61 | 3.95 | 1.1E+07 |
|  | 7-2 | 30 | 8.89 | 3.92 | 1.2E+07 |
|  | 7-3 | 40 | 8.58 | 3.39 | 1.1E+07 |
|  | 7-4 | 50 | 9.31 | 3.17 | 8.0E+06 |
|  | 7-5 | 60 | 9.34 | 3.44 | <8.0E+06 |
|  | 7-6 | 70 | 9.87 | 3.83 | <8.0E+06 |

[8-2] Effect of Grain Diameter Control Layer

In the case (Comparative Example 4, sample number=7-3) where the TiN—MgO second seed layer is prepared on a layer without containing a grain diameter control layer, as shown by a SEM photograph in FIG. 15, the magnetic recording layer is in a state where minute grains of several nanometers in grain diameter and huge grains of several tens nanometers in grain diameter coexist. A magnetic recording layer of a granular structure with uniform grains is not given, unlike the case (Example 2, sample number=2-3) in FIG. 4 where the magnetic layer is formed on the layer containing the grain diameter control layer.

As shown with circles and squares in FIG. 12, average grain diameters of crystal grains of magnetic recording layers in the cases (Comparative Examples 2, 5) where the second seed layers do not contain MgO are 9.7 nm in a sample (circles) containing the grain diameter control layer, and 9.5 nm in a sample (squares) without containing a grain diameter control layer, which is large as well.

The average grain diameter of crystal grains of the magnetic recording layer of the sample (Comparative Example 4) without containing a grain diameter control layer does not show a reduction tendency even if MgO is added, as shown with squares in FIG. 12, and is 8.6 to 9.9 nm. The average grain diameter is larger compared to the sample (Example 1) containing the grain diameter control layer shown with circles in FIG. 7.

The grain diameter dispersion of crystal grains of the magnetic recording layer of the sample (Comparative Example 4) without containing a grain diameter control layer decreases only up to around 3.2 to 4.0 nm even if MgO is added, as shown with squares in FIG. 13. The grain diameter dispersion is also larger compared to the sample (Example 1) containing the grain diameter control layer as shown with circles in FIG. 13. Since they do not fall into less than 3 nm that is a reference for application to a magnetic recording medium, they cannot be applied to a magnetic recording medium.

The magnetic anisotropy constant of the sample (Comparative Example 4) without containing a grain diameter control layer increases up to 30 vol % in MgO addition amount, and decreases greatly at 50 vol % or more, as shown with squares in FIG. 14. The improvement of the magnetic anisotropy constant up to 40 vol %, which was observed in the sample (Example 1) containing the grain diameter control layer shown with circles in FIG. 9, is not observed. Moreover, at 50 vol % or more, a magnetic anisotropy constant has fallen below $1.0 \times 10^7$ erg/cm$^3$ that is a reference for an application to a magnetic recording medium.

As described above, in the cases of containing the TiN—MgO second seed layer and without forming a grain diameter control layer, it is not possible to obtain the sample that satisfies both grain diameter dispersion and magnetic anisotropy constant applicable to a magnetic recording medium. In the cases of containing the TiN—MgO second seed layer, as a result of formation of a grain diameter control layer, it is possible to make both average grain diameter and grain diameter dispersion of magnetic crystal grains of a magnetic recording layer remarkably small and also improve a magnetic anisotropy constant.

[9] Comparison Between Example 1 and Comparative Examples 2, 6

[9-1] Samples in which ZrO$_2$ is Used as X in Second Seed Layer

As to the layer configuration in Comparative Example 6, TiN—ZrO$_2$ was used as the second seed layer, compared to the second seed layer of TiN—Al$_2$ O$_3$ in Example 1. As to a layer configuration in Comparative Example 6, plural samples having different ZrO$_2$ addition amounts were prepared. In Table 17 and FIGS. 16 to 19, addition amounts and results are shown.

Figure 16:
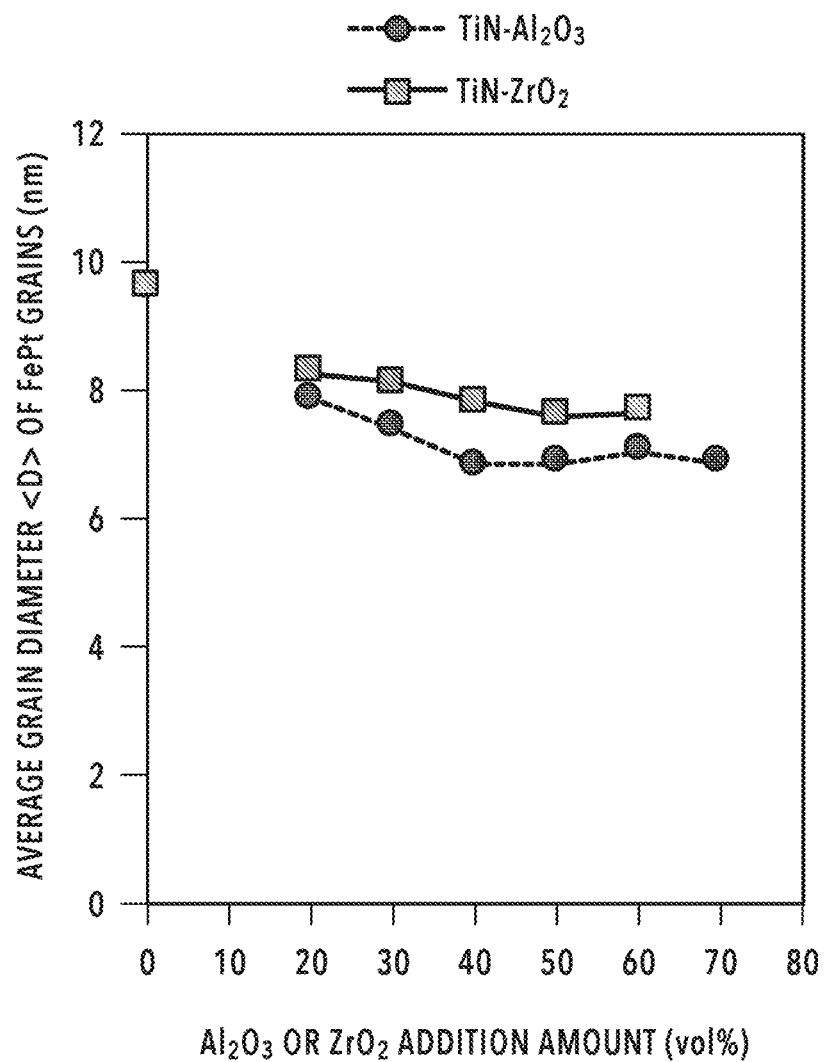
FIG. 16 shows a comparison of average grain diameters between Example 1 and Comparative Examples 2, 6.
Figure 17:
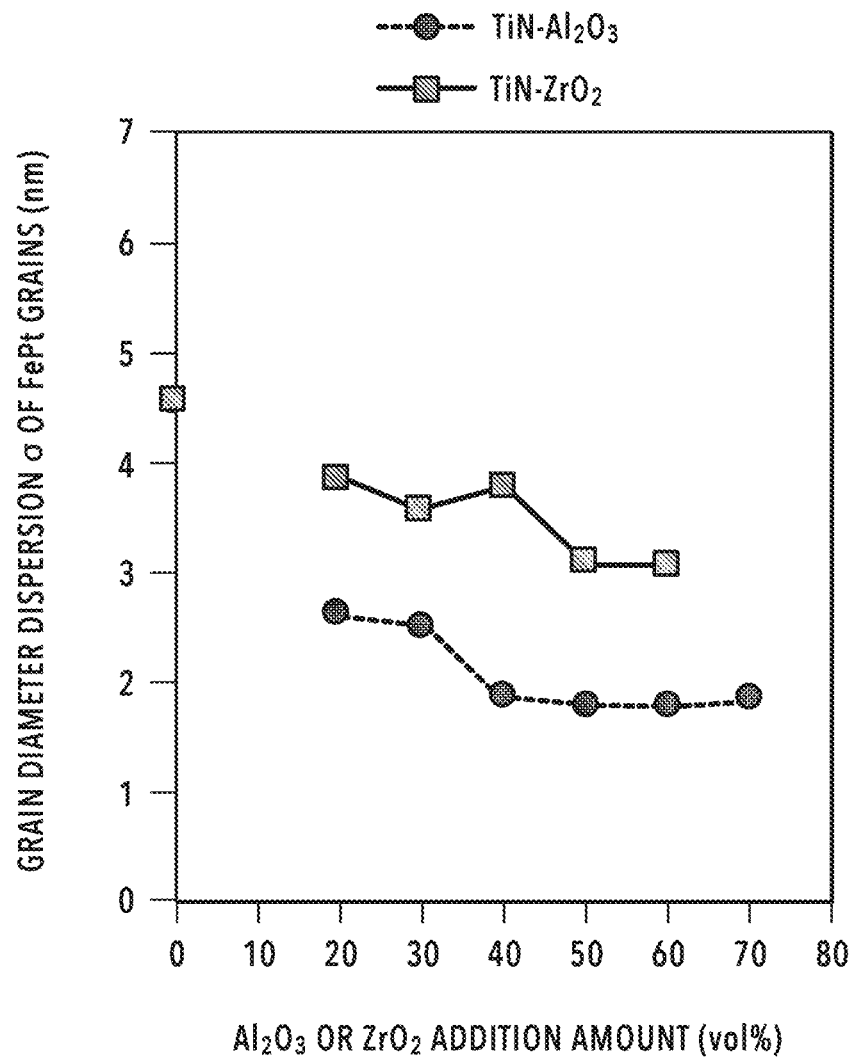
FIG. 17 shows a comparison of grain diameter dispersions between Example 1 and Comparative Examples 2, 6.
Figure 18:
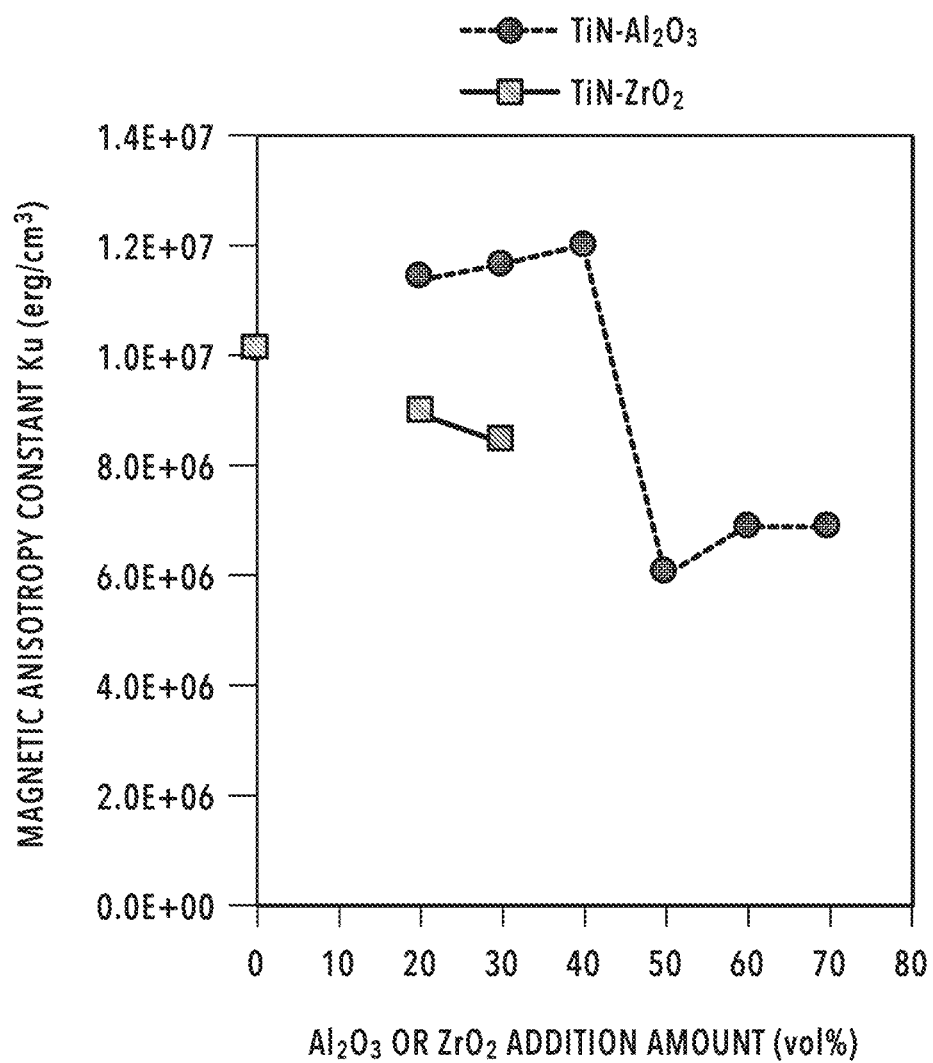
FIG. 18 shows a comparison of magnetic anisotropy constants between Example 1 and Comparative Examples 2, 6.
Figure 19A:
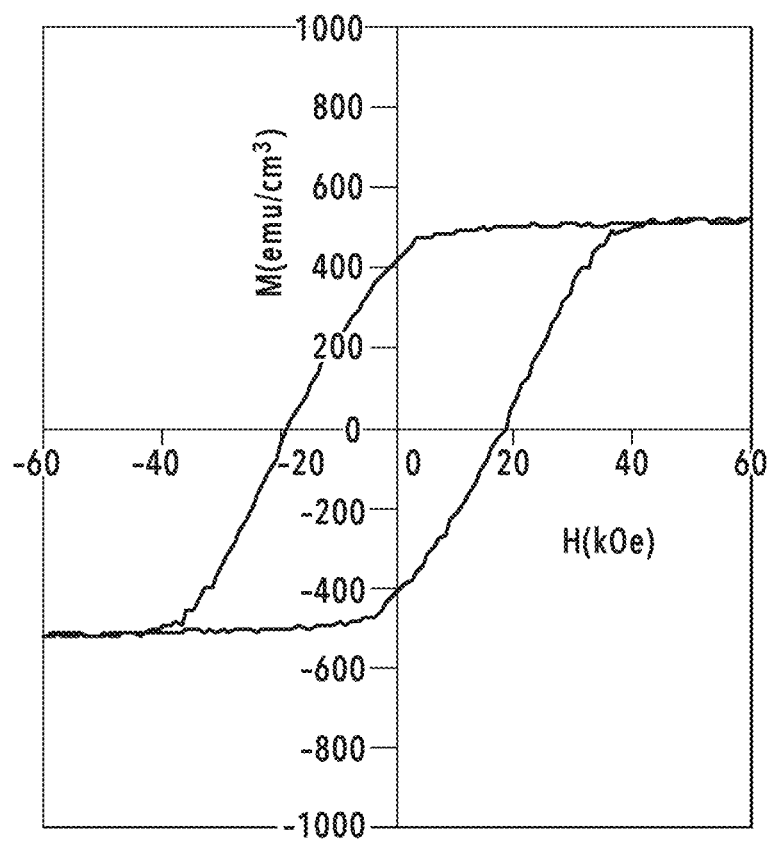
FIG. 19A shows a magnetization curve of sample number=1-3 in Example 1.
Figure 19B:
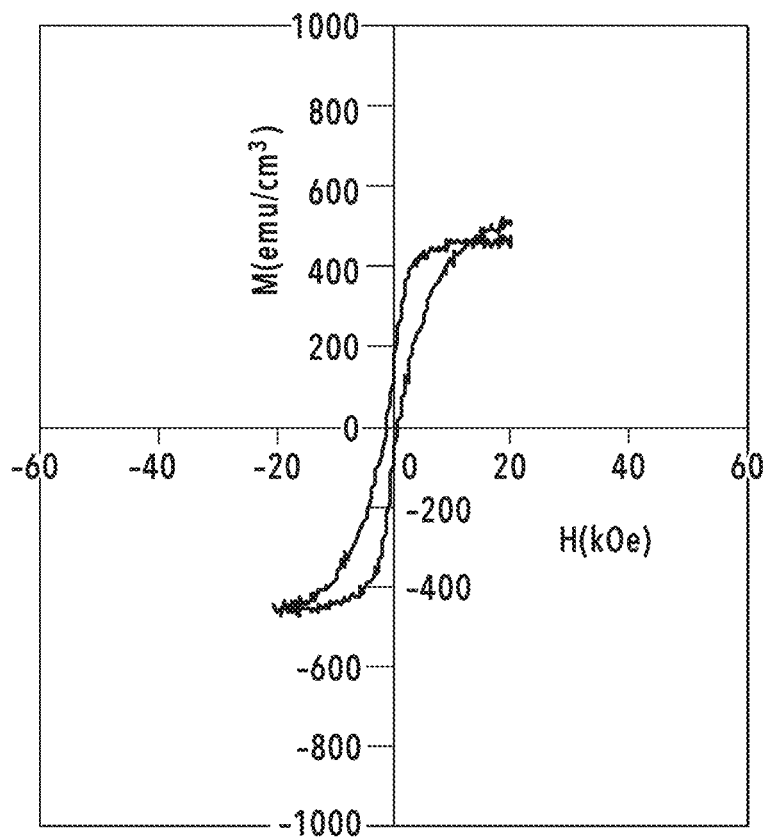
FIG. 19B shows a magnetization curve of sample number=10-3 in Comparative Example 6.

FIG. 16 shows a comparison of average grain diameters between Example 1 and Comparative Examples 2, 6. FIG. 17 shows a comparison of grain diameter dispersions between Example 1 and Comparative Examples 2, 6. FIG. 18 shows a comparison of magnetic anisotropy constants between Example 1 and Comparative Examples 2, 6. FIG. 19A shows a magnetization curve of sample number=1-3 in Example 1. FIG. 19B shows a magnetization curve of sample number=10-3 in Comparative Example 6.

TABLE 17

Average grain diameter and grain diameter dispersion of FePt and magnetic anisotropy constant Ku of FePt layer

| Example and Comparative Example | Sample No. | ZrO$_2$ addition amount (vol %) | Average grain diameter <D> (nm) | Grain diameter dispersion σ (nm) | Magnetic anisotropy constant Ku (erg/cm$^3$) |
|---|---|---|---|---|---|
| Comparative Example 2 | 5 | 0 | 9.66 | 4.55 | 1.0E+07 |
| Comparative Example 6 | 10-1 | 20 | 8.28 | 3.87 | 9.0E+06 |
|  | 10-2 | 30 | 8.12 | 3.57 | 8.4E+06 |
|  | 10-3 | 40 | 7.82 | 3.80 | <8.0E+06 |
|  | 10-4 | 50 | 7.61 | 3.07 | <8.0E+06 |
|  | 10-5 | 60 | 7.66 | 3.05 | <8.0E+06 |

[9-2] as to Average Grain Diameter and Grain Diameter Dispersion in the Cases where ZrO$_2$ is Used as X in Second Seed Layer An average grain diameter of crystal grains of a magnetic recording layer in the case where TiN—ZrO$_2$ is used as a second seed layer decreases as compared with the sample without addition of ZrO$_2$ (Comparative Example 2) as shown with squares in FIG. 16. The average grain diameter decreases in line with the increase in ZrO$_2$ addition amount up to a ZrO$_2$ addition amount of 50 vol %, and becomes constant in around 7.6 to 7.8 nm at 50 vol % or more. The tendency of decrease is similar to the case (Example 1) where TiN—Al$_2$ O$_3$ is used as the second seed layer, but the decrease amount is smaller.

A grain diameter dispersion decreases by adding ZrO$_2$ as compared with the case without the addition, as shown with squares in FIG. 17 and in Table 17, but the decrease amount is smaller as compared with the case (Example 1) where TiN—Al$_2$ O$_3$ is used as the second seed layer, as shown with circles in FIG. 17. Moreover, although the grain diameter dispersion decreases in line with the increase in a ZrO$_2$ addition amount, the grain diameter dispersion is 3.1 nm even if the addition reaches 60 vol %. The grain diameter dispersion does not become less than 3 nm that is a reference for an application to a magnetic recording medium. This means that it cannot be applied as a magnetic recording medium.

[9-3] as to Magnetic Property in the Case where ZrO$_2$ is Used as X in Second Seed Layer A magnetic anisotropy constant of a magnetic recording layer in the case where TiN—ZrO$_2$ is used as a second seed layer deteriorates by adding ZrO$_2$ and has fallen below $1.0 \times 10^7$ erg/cm$^3$, as shown with squares in FIG. 18 and in Table 17. This means that it cannot be used as a magnetic recording medium.

Moreover, as shown in FIG. 19A, a magnetization curve in the case (Example 1) where TiN—Al$_2$ O$_3$ is used as the second seed layer gives a coercive force of 20 kOe, which is equal to or more than the coercive force of 15 kOe that is a reference for an application to a magnetic recording medium. On the other hand, as shown in FIG. 19B, a magnetization curve in the case (Comparative Example 6) where TiN—ZrO$_2$ is used as the second seed layer gives a coercive force of only around 1 kOe. This means that it cannot be applied as a magnetic recording medium.

[10] Consideration of TiN—X of Second Seed Layer

To form a magnetic recording layer into a good granular structure, it is necessary that TiN crystal grains and a grain boundary material X coexist in the second seed layer. Therefore, preferably TiN and X have lower reactivity with each other. Upon considering the reactivity between TiN and X, substrate temperature (from 20° C. to 600° C.) in the deposition of the second seed layer and substrate temperature (from 300° C. to 600° C.) in the deposition of the magnetic recording layer were taken into consideration, and standard Gibbs energy of formation at 500° C. (expressed as $\Delta G_{500}$) was examined.

In Table 18, standard Gibbs energies of formation $\Delta G_{500}$ of a nitriding reaction and oxidation reaction of various metal elements at 500° C. are shown. Here, Si and B were also examined as metal elements.

In TiN—X of a second seed layer, the cases of X=$Al_2O_3$ or MgO did not deteriorate a magnetic property of an FePt layer, but in the case of X=$ZrO_2$ a magnetic property deteriorated. The reason of this is considered that a defect was generated in a TiN crystal by $ZrO_2$ and that crystallinity of heteroepitaxially grown FePt crystals became worse.

In Table 19, standard Gibbs energies of formation $\Delta G_{500}$ of a nitriding reaction and carbonization reaction of Ti at 500° C. are shown.

As shown in Table 19, TiN has lower $\Delta G_{500}$ and is more stable than TiC. In TiN—X of a second seed layer, X=C also does not generate a defect in a TiN crystal. It is considered that, therefore, X=C (Example 3) also provided an effect similar to X=$Al_2O_3$ (Example 1) and X=MgO (Example 2).

TABLE 18

Standard Gibbs energies of formation $\Delta G_{500}$ of nitriding reaction and oxidation reaction at 500° C. of various metal elements *1)

| Element | Nitriding reaction *2) | $\Delta G_{500}$ | Reaction formula | Oxidation reaction *3) | $\Delta G_{500}$ | Reaction formula |
|---|---|---|---|---|---|---|
| Ti | Reference | −523 | $2Ti + N_2 = 2TiN$ | Reference | −792 | $Ti + O_2 = TiO_2$ |
| Si | Good | −245 | $3/2Si + N_2 = 1/2Si_3N_4$ | Bad | −766 | $Si + O_2 = SiO_2$ |
| Ca | Good | −285 | $3Ca + N_2 = Ca_3N_2$ | Good | −1104 | $2Ca + O_2 = 2CaO$ |
| Mg | Good | −300 | $3Mg + N_2 = Mg_3N_2$ | Good | −1031 | $2Mg + O_2 = 2MgO$ |
| B | Good | −370 | $2B + N_2 = 2BN$ | Bad | −708 | $4/3B + O_2 = 2/3B_2O_3$ |
| Ta | Good | −451 | $4Ta + N_2 = 2Ta_2N$ | Bad | −674 | $4/5Ta + O_2 = 2/5Ta_2O_5$ |
| Al | Good | −470 | $2Al + N_2 = 2AlN$ | Good | −950 | $4/3Al + O_2 = 2/3Al_2O_3$ |
| Co | Good | — | No reaction | Bad | −288 | $3/2Co + O_2 = 1/2Co_3O_4$ |
| Sc | Good | — | No reaction | Good | −1113 | $4/3Sc + O_2 = 2/3Sc_2O_3$ |
| Sr | Good | — | No reaction | Good | −1017 | $2Sr + O_2 = 2SrO$ |
| Y | Good | — | No reaction | Good | −1112 | $4/3Y + O_2 = 2/3Y_2O_3$ |
| Zr | Bad | −577 | $2Zr + N_2 = 2ZrN$ | Good | −997 | $Zr + O_2 = ZrO_2$ |
| Hf | Bad | −647 | $2Hf + N_2 = 2HfN$ | Good | −1045 | $Hf + O_2 = HfO_2$ |

*1) From "Handbook of Chemistry: Pure Chemistry, 5th ed. (edited by The Chemical Society of Japan), calculated from standard entropy, standard Gibbs energy of formation etc.
*2) Values larger than $\Delta G_{500}$ of nitriding reaction of Ti are good, and values smaller than that are bad.
*3) Values smaller than $\Delta G_{500}$ of oxidation reaction of Ti are good, and values larger than that are bad.

In the case where X in TiN—X is a metal oxide, in view of Gibbs free energies $\Delta G_{500}$ s at 500° C., a metal oxide, which contains a metal element whose $\Delta G_{500}$ of a nitriding reaction is higher than $\Delta G_{500}$ of a nitriding reaction of Ti, is preferable. As a consequence, nitrogen deficiency of a TiN crystal is not generated.

Moreover, a metal oxide, which contains a metal element whose $\Delta G_{500}$ of an oxidation reaction is lower than $\Delta G_{500}$ of an oxidation reaction of Ti, is preferable. As a consequence, a defect due to oxidation of a part of a TiN crystal is not generated.

X in TiN—X has preferably at least one or more consisting of $Al_2O_3$ (Example 1), MgO (Example 2), CaO, $Sc_2O_3$, SrO and $Y_2O_3$ as a main component, which are metal oxides composed of a metal element having higher $\Delta G_{500}$ of a nitriding reaction than Ti and lower $\Delta G_{500}$ of an oxidation reaction than Ti in Table 18.

On the other hand, in $ZrO_2$ (Comparative Example 1) and $HfO_2$, $\Delta G_{500}$ of a nitriding reaction of a metal element contained in the oxides is lower than the energy of a nitriding reaction of Ti. Therefore, it is considered that nitrogen is taken from a TiN crystal to thereby generate a defect in the TiN crystal, which is unfavorable.

Moreover, in $SiO_2$, $B_2O_3$, $Ta_2O_5$ and $Co_3O_4$, $\Delta G_{500}$ of an oxidation reaction of a metal element contained in the oxides is higher than $\Delta G_{500}$ of an oxidation reaction of Ti. Therefore, it is believed that oxygen is supplied to a TiN crystal, and that a defect due to oxidation of a part of the TiN crystal may be generated, which is unfavorable.

TABLE 19

Comparison of Standard Gibbs energies of formation $\Delta G_{500}$ of nitriding reaction and carbonization reaction at 500° C. of Ti

| Reaction formula | $\Delta G_{500}$ |
|---|---|
| $2Ti + N_2 = 2TiN$ | −523 |
| $2Ti + 2C = 2TiC$ | −349 |

[11] Summary

In these Examples, on the Ru—$TiO_2$ grain diameter control layer 2, and on the MgO/ZnO first seed layer 3, the TiN—X second seed layer 4 was formed, and the FePt—C magnetic recording layer 5 was formed.

When the magnetic recording layer 5 is deposited directly on the first seed layer 3, an average grain diameter and grain diameter dispersion become large. Wettability between MgO crystal grains of the upper first seed layer 3b and FePt crystal grains of the magnetic recording layer 5 is bad. Therefore, an FePt crystal grain is not adequately formed on a MgO crystal grain. As a result, there is generated a part in which an FePt crystal grain is formed straddling a MgO crystal grain, and an average grain diameter and grain diameter dispersion of the magnetic recording layer 5 become large.

Consequently, on the first seed layer 3, the second seed layer 4 using TiN crystal grains having good wettability with an FePt crystal grain was formed, and then the magnetic recording layer 5 was deposited. However, when the second seed layer 4 was formed using TiN alone, grains were formed while straddling a grain boundary of TiN crystal grains. The reason of this is that wettability between the TiN crystal grain and the FePt crystal grain is good, and the FePt crystal grain has spread. On the other hand, when the second seed layer 4 was formed with TiN—X (X=$Al_2O_3$ or MgO), the spread of the FePt crystal grain was suppressed and, as a consequence, the grain structure of the grain diameter control layer was taken over. Therefore, it became possible to form an FePt granular magnetic recording layer with a minute average grain diameter and suppressed grain diameter dispersion.

By forming the first seed layer, and the second seed layer 4 composed of TiN—X on the grain diameter control layer 2 having a granular structure, the magnetic recording layer 5 became a granular structure taking over the granular structure of the grain diameter control layer 2. It was confirmed that, as a result, effects were exhibited on causing the grain diameter to be minute and reducing the grain diameter dispersion in the granular structure of the magnetic recording layer 5. As a consequence of the grain diameter control layer 2 and the non-magnetic intermediate layer 8 having a granular structure, crystal grains that are minute with a reduced grain diameter dispersion are obtained also in the first seed layer 3. Thus, it is a result that X in the second seed layer 4 is actively segregated to the grain boundary of TiN crystal grains.

More preferably, as a consequence of the grain diameter control layer 2 and the non-magnetic intermediate layer 8 having the granular structure, crystal grains that are minute with a reduced grain diameter dispersion are obtained also in the first seed layer 3. Thus, it is a result that the second seed layer 4 has a granular structure composed of crystal grains composed of TiN and a grain boundary material X surrounding the circumference of the TiN crystal grain. As a consequence of the second seed layer 4 having the granular structure composed of crystal grains composed of TiN and the grain boundary material X surrounding the circumference of the TiN crystal grain, the magnetic recording layer 5, which is formed thereon and has crystal grains composed of an ordered alloy such as FePt, has a granular structure taking over the granular structure of the second seed layer 4. Eventually the magnetic recording layer 5, takes over the granular structure of the grain diameter control layer 2. Therefore, a magnetic recording layer with a minute average grain diameter and a suppressed grain diameter dispersion can be formed. TiN—X mediates the granular structure of the grain diameter control layer 2 to the granular structure of the magnetic recording layer. As the result, the average grain diameter and grain diameter dispersion of magnetic crystal grains of the magnetic recording layer 5 can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their entirety.

What is claimed is:

1. A magnetic recording medium, comprising
a substrate, a grain diameter control layer, a first seed layer, a second seed layer, and a magnetic recording layer, disposed above one another in this order, wherein the recording layer contains an ordered alloy,
the second seed layer is composed of
   (i) crystal grains having TiN as a main component, and
   (ii) a grain boundary material having at least one or more materials selected from the group consisting of a metal oxide and carbon, as a main component,
the second seed layer is free of any solid solution that is formed between crystalline particles of TiN and the grain boundary material, and
the grain boundary material is in a range of 5 volume % to 50 volume % of the total amount of crystal grains having TiN as the main component and the grain boundary material.

2. The magnetic recording medium according to claim 1, wherein, the grain boundary material is a metal oxide, and for $\times G_{500}$ defined as a standard Gibbs energy of formation at 500° C., $\Delta G_{500}$ of a nitride that is formed through a reaction between nitrogen and a metal element in the metal oxide constituting the grain boundary material is higher than $\Delta G_{500}$ of TiN.

3. The magnetic recording medium according to claim 1, wherein, the grain boundary material is a metal oxide, and for $\Delta G_{500}$ defined as a standard Gibbs energy of formation at 500° C., $\Delta G_{500}$ of the metal oxide constituting the grain boundary material is lower than $\Delta G_{500}$ of $TiO_2$.

4. The magnetic recording medium according to claim 1, wherein the grain boundary material is at least one oxide selected from the group consisting of $Al_2O_3$, MgO, CaO, $Sc_2O_3$, SrO and $Y_2O_3$.

5. The magnetic recording medium according to claim 1, wherein the grain boundary material is formed from carbon.

6. The magnetic recording medium according to claim 1, wherein the second seed layer has a granular structure composed of crystal grains having TiN as the main component and the grain boundary material surrounding circumferences of the crystal grains having TiN as the main component.

7. The magnetic recording medium according to claim 1, wherein the magnetic recording layer contains at least one first element selected from the group consisting of Fe and Co, and at least one second element selected from the group consisting of Pt, Pd, Au, Ir, Ru and Rh.

8. The magnetic recording medium according to claim 1, wherein the first seed layer includes a lower first seed layer and an upper first seed layer on the lower first seed layer.

9. The magnetic recording medium according to claim 1, wherein the grain diameter control layer has a granular structure containing Ru crystal grains and at least one selected from the group consisting of oxides, carbides and nitrides surrounding the Ru crystal grains.

10. The magnetic recording medium according to claim 1, further comprising a non-magnetic intermediate layer between the grain diameter control layer and the first seed layer, wherein the non-magnetic intermediate layer has a granular structure containing Pt crystal grains, or Pt crystal grains and at least one selected from the group consisting of oxides, carbon, carbides and nitrides, surrounding the Pt crystal grains.

11. The magnetic recording medium according to claim 1, further comprising an orientation control layer formed from Ru or a Ru alloy between the substrate and the grain diameter control layer.

12. The magnetic recording medium according to claim 1, wherein a grain diameter dispersion σ of the second seed layer is less than 3.0 nm.

13. The magnetic recording medium according to claim 1, wherein a magnetic anisotropy constant Ku of the magnetic recording medium is 1.0E+07 or more.

14. The magnetic recording medium according to claim 1, wherein an average grain diameter D of the second seed layer is 8.00 nm or less.

* * * * *